US011493149B1

(12) United States Patent
Albrecht et al.

(10) Patent No.: US 11,493,149 B1
(45) Date of Patent: Nov. 8, 2022

(54) MODULAR UTILITY SYSTEM

(71) Applicant: BAKER MECHANICAL, INC., Ankeny, IA (US)

(72) Inventors: Shane Albrecht, Madrid, IA (US); Suzie Martinson, Stuart, IA (US); Rob Cross, Altoona, IA (US); Brandon Hummel, Urbandale, IA (US); Stephen Brommel, Pleasant Hill, IA (US)

(73) Assignee: BAKER MECHANICAL, INC., Ankeny, IA (US)

( * ) Notice: Subject to any disclaimer, the term of this patent is extended or adjusted under 35 U.S.C. 154(b) by 0 days.

(21) Appl. No.: 17/195,800

(22) Filed: Mar. 9, 2021

(51) Int. Cl.
*F16L 3/00* (2006.01)
*F16M 11/24* (2006.01)

(52) U.S. Cl.
CPC ............... *F16L 3/00* (2013.01); *F16M 11/24* (2013.01)

(58) Field of Classification Search
CPC .................................. F16L 3/00; F16M 11/24
USPC ........................................................ 248/558
See application file for complete search history.

(56) References Cited

U.S. PATENT DOCUMENTS

| | | | | |
|---|---|---|---|---|
| 3,226,069 A | * | 12/1965 | Clarke | F16L 3/2431 24/282 |
| 4,050,752 A | * | 9/1977 | Dykstra | B01L 9/02 248/68.1 |
| 4,544,214 A | * | 10/1985 | Nizel | B01L 9/02 312/228 |
| 5,141,186 A | * | 8/1992 | Cusic | F16L 3/2431 248/68.1 |
| 10,077,553 B2 | | 9/2018 | Neumayr | |
| 10,513,848 B2 | | 12/2019 | Faigen | |
| 2006/0096216 A1 | * | 5/2006 | Walter | A47F 5/105 52/474 |
| 2010/0313516 A1 | * | 12/2010 | Kreller | E04G 1/14 52/693 |
| 2017/0122580 A1 | | 5/2017 | Karamanos et al. | |
| 2019/0120507 A1 | | 4/2019 | Vaslag | |

(Continued)

FOREIGN PATENT DOCUMENTS

| | | |
|---|---|---|
| FR | 2436318 | 4/1980 |
| JP | 2012007352 | 1/2012 |
| KR | 101559969 | 10/2015 |

OTHER PUBLICATIONS

Walraven, BISMAT® 5000 brochure, May 2016, 2 pages, walraven.com, USA.

(Continued)

*Primary Examiner* — Muhammad Ijaz
(74) *Attorney, Agent, or Firm* — Stinson LLP

(57) ABSTRACT

A modular utility system and a method of installing a modular utility system. The modular utility system having a frame configured for mounting to a structure. A mount is coupled to the frame. The mount is adjustably movable with respect to the frame in a first direction, and the mount is securable to the frame in a plurality of positions. A conduit is coupled to the mount. The conduit is adjustably movable with respect to the mount in a second direction that is generally perpendicular to the first direction. The mount is configured to secure the conduit in a plurality of positions. Multiple conduits may be secured to the frame with mounts. The conduits may be configured for containing water, air, and/or wastewater.

16 Claims, 23 Drawing Sheets

(56) References Cited

U.S. PATENT DOCUMENTS

2019/0178274 A1\* 6/2019 Katz .................... F24S 25/30

OTHER PUBLICATIONS

Walraven, The New Alternatives to the Strut and Cushion Clamp, The W Series Clamp brochure, Jul. 2019, 8 pages, walraven.com, USA.

\* cited by examiner

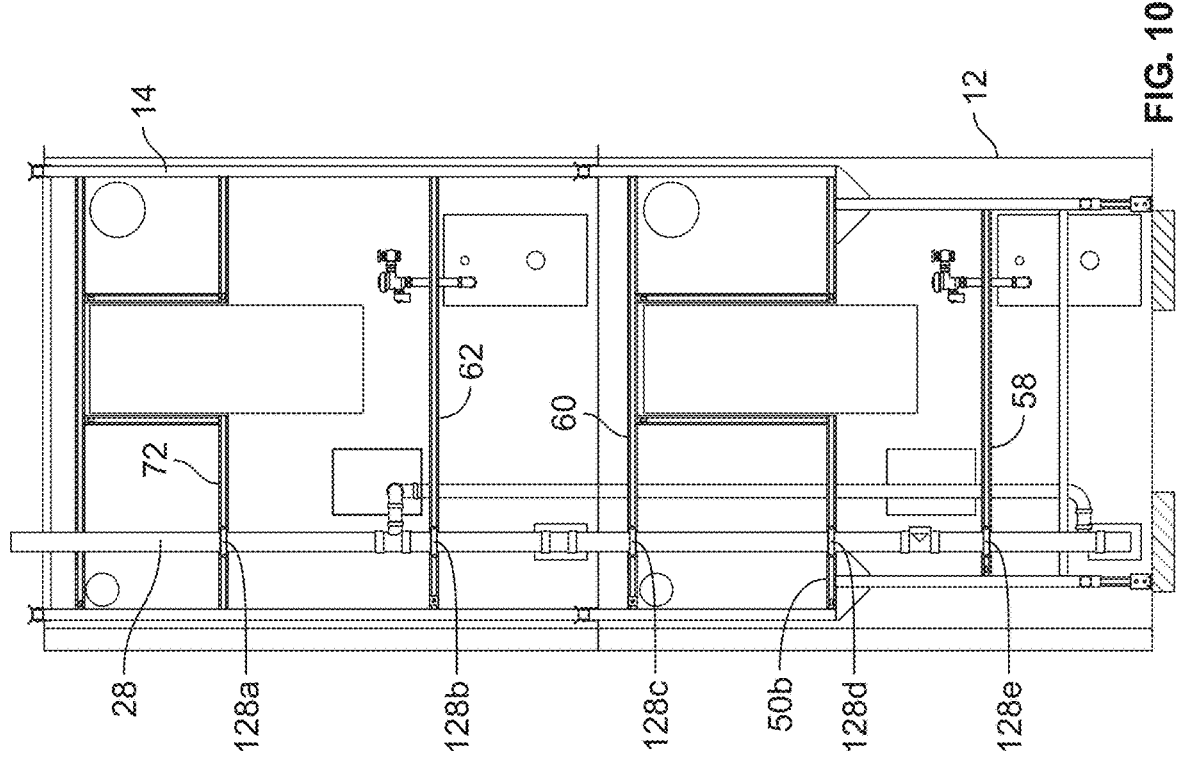
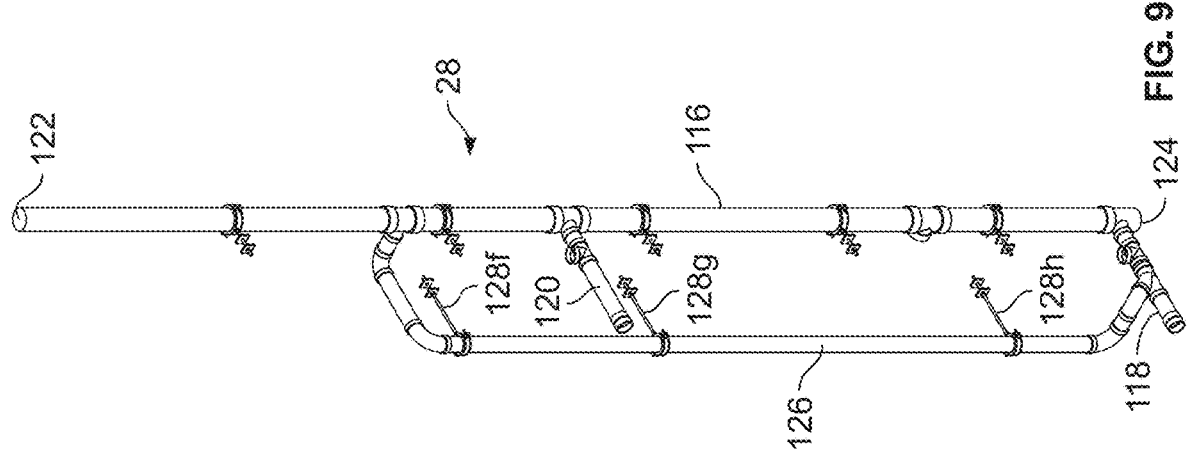

MODULAR UTILITY SYSTEM

CROSS-REFERENCE TO RELATED APPLICATIONS

Not applicable.

BACKGROUND OF THE INVENTION

1. Field of the Invention

The invention is related to a system and method for providing and installing utilities for a structure (e.g., plumbing and HVAC), and more specifically, to a modular system and method for providing and installing utilities for a structure.

2. Description of Related Art

During construction of a structure, utilities such as heating, ventilation, and air conditioning ("HVAC") ducts, water lines, drain-waste-vent lines, and electrical wiring are installed by the applicable skilled construction workers at the appropriate times. The ductwork, plumbing lines, and electrical wiring are typically assembled and installed at the construction site from appropriate available components. For example, a plumbing contractor working on site may assemble and install various plumbing lines, fittings, and valves as necessary to connect various fixtures to public water supply and sewer systems. An HVAC contractor working on site may assemble and install various ductwork to route supply and return lines from different areas of the structure to air handlers. Once installed, the utilities installed in the building may need to be tested to ensure that they are operating properly. For example, the plumbing may be pressure tested to ensure that there are no leaks.

BRIEF SUMMARY OF THE INVENTION

One embodiment of the invention described herein is directed toward a modular utility system having a frame configured for mounting to a structure. A mount is coupled to the frame. The mount is adjustably movable with respect to the frame in a first direction, and the mount is securable to the frame in a plurality of positions. A conduit is coupled to the mount. The conduit is adjustably movable with respect to the mount in a second direction that is generally perpendicular to the first direction. The mount is configured to secure the conduit in a plurality of positions.

In some embodiments, the frame may have a first section that is configured for mounting to the structure, and a second section that is coupled to the first section. The second section being spaced apart from the structure in a third direction when the first section is mounted to the structure. The third direction being generally perpendicular to the first direction and the second direction. The first section of the frame may be receivable within a channel of a frame mount that is configured for mounting to the structure. The second section of the frame may include a first plurality of frame members that extend in the first direction, and a second plurality of frame members that extend in the second direction.

In some embodiments, the conduit may be configured to contain at least one of water, air, or wastewater. The modular utility system may further include a second conduit that is securable to the frame in a plurality of positions, and a third conduit that is securable to the frame in a plurality of positions. The conduit, the second conduit, and the third conduit each being configured to contain at least one of water, air, or wastewater.

In some embodiments, the conduit may have a main section that extends from a first end to a second end, and a branch section that extends from the main section. The branch section being configured for coupling to a portion of the structure.

In some embodiments, the frame defines at least one channel that receives a portion of the mount, and the mount is operable to slide within the channel in the first direction when the mount is not secured to the frame.

In some embodiments, the frame further includes at least one floor mount that is adjustably coupled to a lower end of the frame.

In some embodiments, the mount is movable from an open position, in which the conduit is movable through the mount in the second direction, to a closed position, in which the conduit is secured to the mount.

The modular utility system may be manufactured, assembled, and tested at one location, and then transported to a structure that is under construction. The frame may be mounted to a portion of the structure, and the one or more conduits may be connected to appropriate pipes, lines, ducts, and/or fixtures of the structure. For example, if the conduit is configured for containing water, it may be connected to a fixture of the structure (e.g., a shower, toilet, or sink) and to a main water supply line of the structure for delivering water from the main water supply line to the fixture. If the conduit is configured for containing air, it may be connected to an air inlet or air exhaust register for a particular area of the structure and also to a main air supply or exhaust line of the structure. If the conduit is configured for containing wastewater, it may be connected to a fixture of the structure (e.g., a sink drain, shower drain or toilet) and also to a main sewer line of the structure. The mount connecting the frame to the conduits allows the conduits to be adjusted in the first direction and in the second direction to assist the installer in connecting the conduits to the appropriate lines and fixtures of the structure. Assembly and testing of the conduits offsite prior to installation at the structure allows leaks and other errors to be easily identified and corrected prior to installation.

The invention is also directed to a method of installing a modular utility system including a frame, a mount coupled to the frame and a conduit coupled to the mount. The method includes steps of: mounting the frame to a structure; adjusting the position of the mount and the conduit with respect to the frame in a first direction; securing the mount to the frame in a first fixed position; adjusting the position of the conduit with respect to the mount in a second direction that is generally perpendicular to the first direction; and securing the conduit to the mount in a second fixed position.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

BRIEF DESCRIPTION OF THE DRAWINGS

FIG. 9 is a perspective view of a first drain-waste-vent ("DWV") conduit assembly of the modular utility system shown in FIG. 1;

FIG. 10 is a rear elevational view showing the first DWV conduit assembly mounted to the frame;

DETAILED DESCRIPTION OF EXEMPLARY EMBODIMENTS

Figure 1:
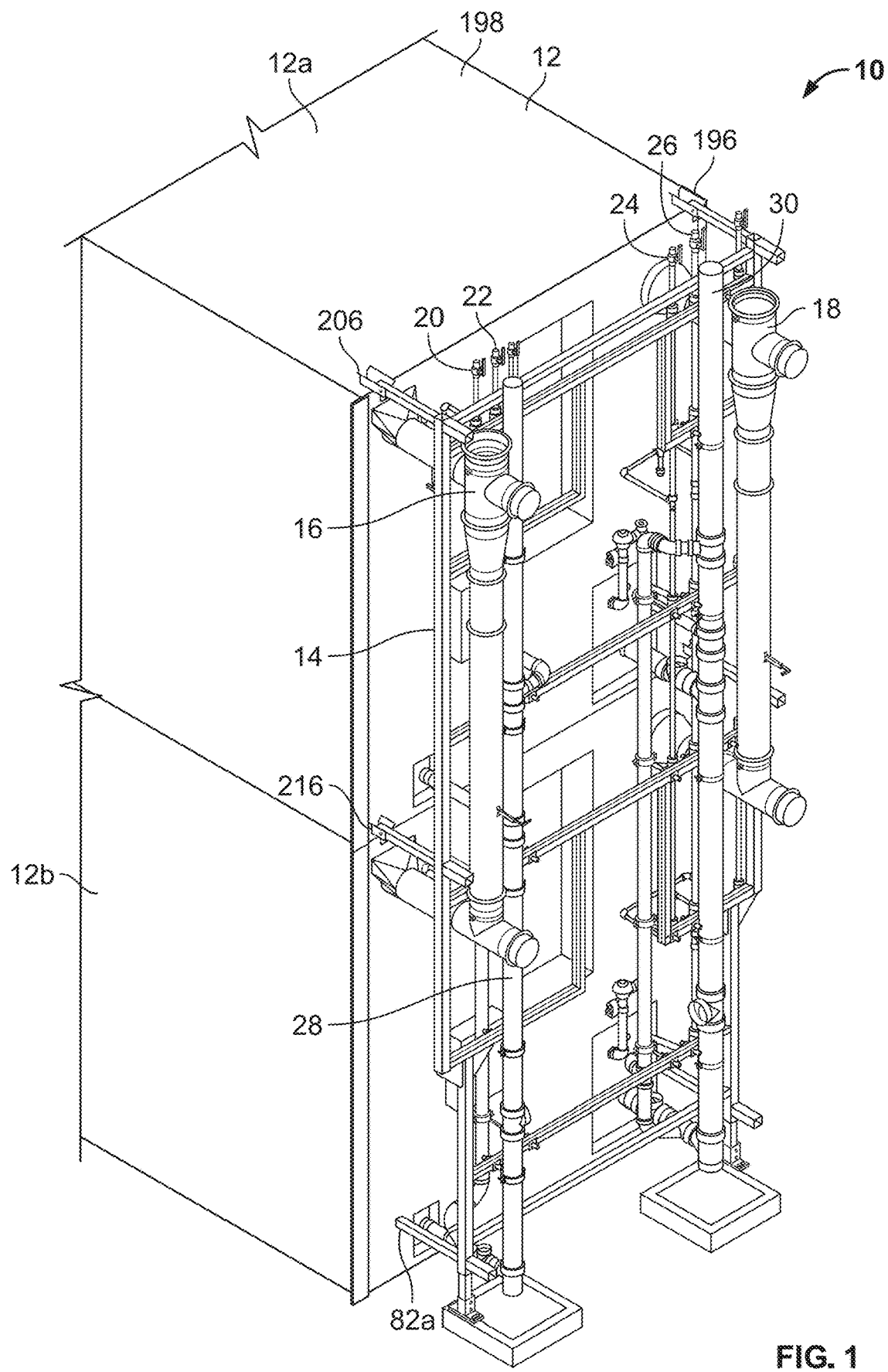
FIG. 1 is a perspective view of a modular utility system in accordance with one embodiment of the invention described herein mounted to the rear wall of a jail cell assembly.

An exemplary embodiment of modular utility system in accordance with the invention described herein is identified generally as 10 in FIG. 1. The modular utility system 10 is shown mounted to the rear wall of a jail cell assembly 12. As described in more detail below, the modular utility system 10 includes a frame 14 that mounts to the jail cell assembly 12. Heating, ventilation, and air conditioning ("HVAC"), drain-waste-vent ("DWV"), and water conduits are adjustably mounted to the frame 14. The modular utility system 10 may be preassembled in a location remote from the jail cell assembly 12 and shipped to the location of the jail cell assembly 12. After mounting the modular utility system 10 to the jail cell assembly 12, the HVAC, DWV, and water conduits may be connected to suitable fittings, openings, or conduits of the jail cell assembly 12. While the modular utility system 10 is described herein and shown in the drawings as being mounted to the jail cell assembly 12, the modular utility system 10 may be mounted to other types of structures other than a jail cell and the modular utility system 10 may be used for other types of applications as desired.

Figure 2:
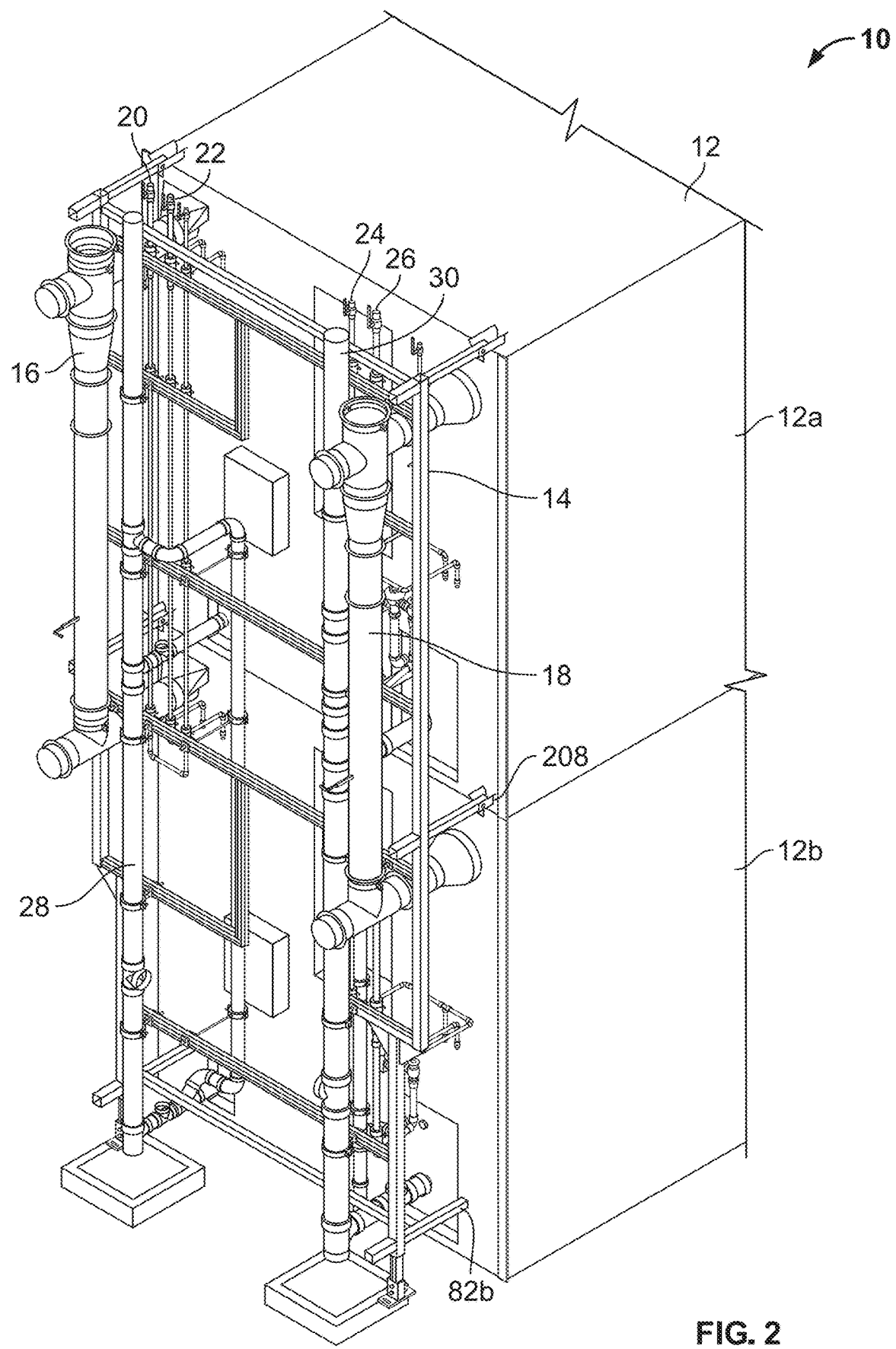
FIG. 2 is another perspective view of the modular utility system shown in FIG. 1.

As shown in FIGS. 1 and 2, the modular utility system 10 includes the frame 14 and the following components that are each adjustably mounted to the frame 14 as described in more detail below: a first HVAC conduit assembly 16, a second HVAC conduit assembly 18, a first water conduit assembly 20, a second water conduit assembly 22, a third water conduit assembly 24, a fourth water conduit assembly 26, a first DWV conduit assembly 28, and a second DWV conduit assembly 30. The jail cell assembly 12 includes an upper jail cell 12a that is positioned above a lower jail cell 12b.

Figure 3:
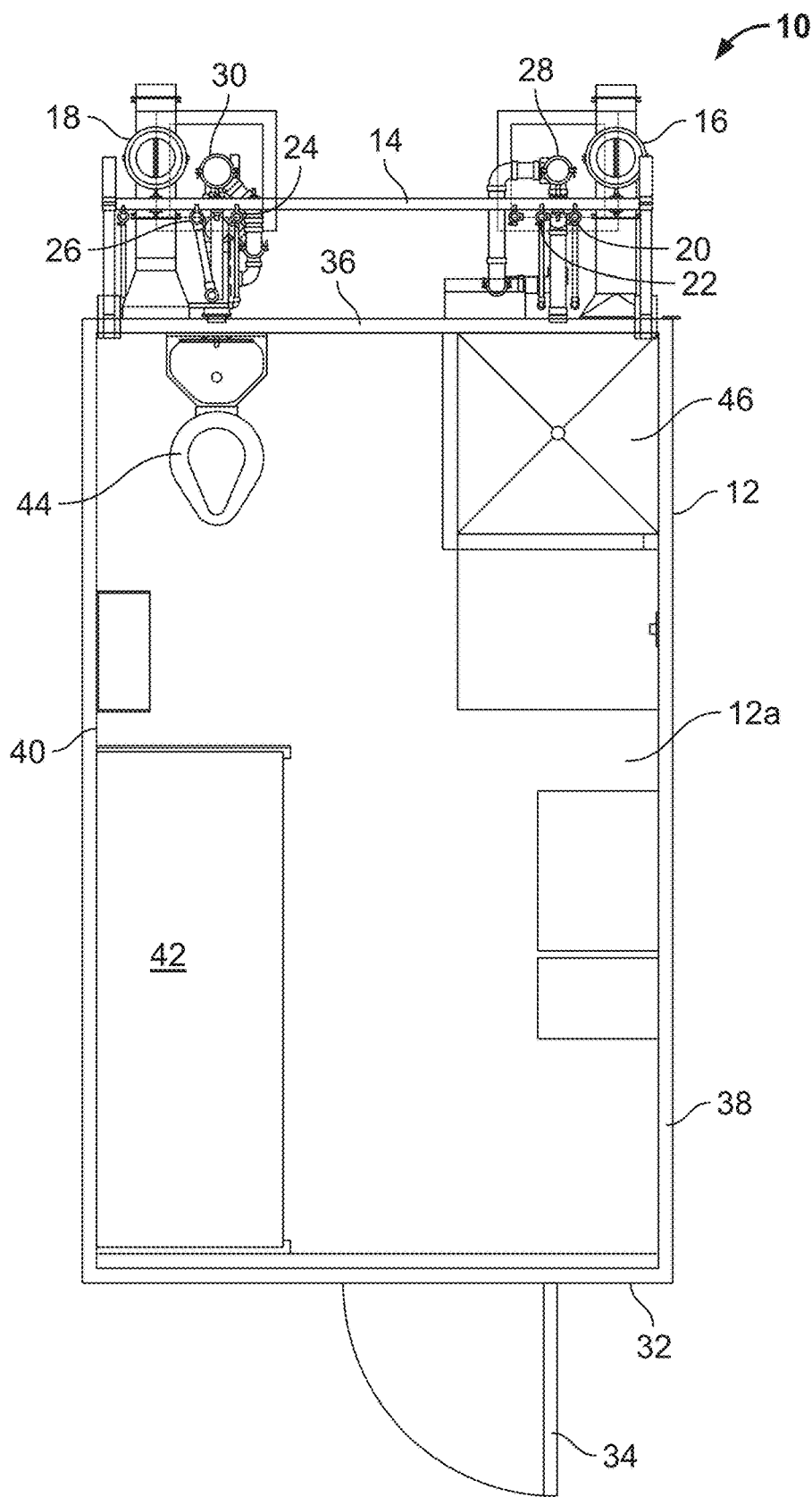
FIG. 3 is a top plan view of the modular utility system and jail cell assembly shown in FIG. 1 showing an exemplary floor plan for a jail cell.

FIG. 3 shows an exemplary floor plan of the upper jail cell 12a. The upper jail cell 12a includes a front wall 32 with a door 34, a rear wall 36 opposite the front wall 32, and side walls 38 and 40. The upper jail cell 12a includes a bed or cot 42, a combination sink/toilet 44, and a shower 46. The lower jail cell 12b may have a similar floor plan as the upper jail cell 12a.

Figure 4:
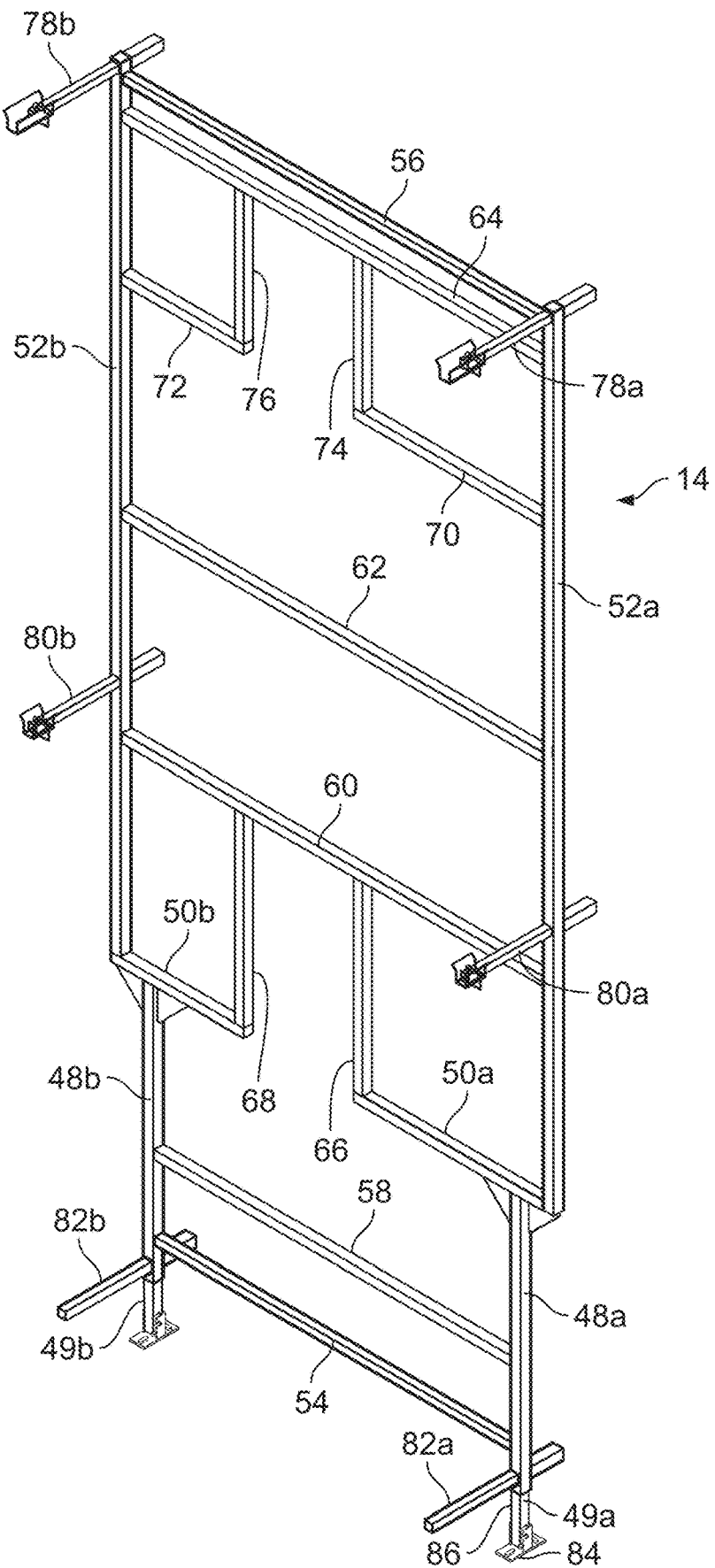
FIG. 4 is a perspective view of a frame of the modular utility system shown in FIG. 1.

Referring to FIG. 4, the frame 14 includes a plurality of frame members (e.g., bars or tubes) that are joined together by welding or other suitable means. The frame members include lower vertical frame members 48a,b having lower ends that are adjustably mounted to floor mounts 49a,b, respectively. Upper ends of the lower vertical frame members 48a,b are joined to horizontal frame members 50a,b, respectively, with gusset plates. The lower vertical frame members 48a,b are also joined to upper vertical frame members 52a,b, respectively, with gusset plates. A lower horizontal frame member 54 is joined to and extends between the lower vertical frame members 48a,b, and an upper horizontal frame member 56 is joined to and extends between the upper vertical frame members 52a,b. A horizontal frame member 58 is joined to and extends between the lower vertical frame members 48a,b. Further horizontal frame members 60, 62, and 64 are each joined to and extend between the upper vertical frame members 52a,b. A vertical frame member 66 is joined to an inner end of the horizontal frame member 50a and extends upwardly to where it joins to the horizontal frame member 60. Another vertical frame member 68 is joined to an inner end of the horizontal frame member 50b and extends upwardly to where it joins to the horizontal frame member 60. Horizontal frame members 70 and 72 are joined to upper vertical frame members 52a,b, respectively, and extend inwardly to vertical frame members 74 and 76. Vertical frame members 74 and 76 are joined to horizontal frame members 70 and 72 and extend upwardly to where they are joined to horizontal frame member 64.

The frame members 48a,b, 50a,b, 52a,b, 54, 56, 58, 60, 62, 64, 66, 68, 70, 72, 74, and 76 are all generally positioned in a first plane. Extending outward in a generally perpendicular manner from that plane are six frame members 78a,b, 80a,b, and 82a,b. Frame members 78a,b are joined to and extend outward from upper ends of upper vertical frame members 52a,b, respectively. Frame members 80a,b are joined to and extend outward from upper vertical frame members 52*a,b*, respectively, at a location that is approximately half the overall height of the frame 14. Frame members 82*a,b* are joined to and extend outward from lower ends of lower vertical frame members 48*a,b*, respectively.

The frame members 78*a,b*, 80*a,b*, and 82*a,b* may form a first section of the frame 14 that is configured for mounting the frame 14 to a structure (e.g., the jail cell assembly 12), and the frame members 48*a,b*, 50*a,b*, 52*a,b*, 54, 56, 58, 60, 62, 64, 66, 68, 70, 72, 74, and 76 may form a second section of the frame 14 that is configured for adjustably mounting HVAC, water, DWV, and electrical conduits or pathways. The connection between the frame members 78*a,b*, 80*a,b*, and 82*a,b* and the jail cell assembly 12 is described in more detail below with respect to FIGS. 21-23. The frame members 78*a,b*, 80*a,b*, and 82*a,b* extend generally perpendicular from the second section of the frame 14, which spaces apart the second section of the frame 14 from the jail cell assembly 12 when the frame 14 is mounted to the jail cell assembly 12 as shown in FIGS. 1-3. The second section of the frame 14 is generally positioned within a plane that is generally parallel to the rear wall 36 of the jail cell assembly 12, as shown best in FIG. 3.

At least some of the frame members 48*a,b*, 50*a,b*, 52*a,b*, 54, 56, 58, 60, 62, 64, 66, 68, 70, 72, 74, and 76 are strut channels that allow for the adjustable mounting of HVAC, water, DWV, and electrical conduits or pathways, as described below in connection with FIGS. 24-26. In one exemplary embodiment, the frame members 50*a-b*, 58, 60, 62, 64, 66, 68, 70, 72, 74, and 76 are strut channels. The strut channels may also be back-to-back strut channels with channels both facing toward and away from the jail cell assembly 12 to allow for mounting on the side of frame 14 facing the jail cell assembly 12 and the side of the frame facing away from the jail cell assembly 12.

The floor mounts 49*a,b* are substantially similar and thus only floor mount 49*a* is described in detail herein. Floor mount 49*a* includes a bracket 84 that is mounted to a vertical member 86. The vertical member 86 is inserted into an opening at the lower end of lower vertical frame member 48*a* such that the floor mount 49*a* is vertically adjustable with respect to the lower vertical frame member 48*a*. The bracket 84 rests on the floor adjacent the jail cell assembly 12 and has openings that can receive fasteners for joining the bracket 84 to the floor. The vertical member 86 can be welded or otherwise joined to the lower vertical frame member 48*a* when the frame 14 is mounted in position on the jail cell assembly 12.

While FIG. 4 shows one exemplary configuration of frame 14, other configurations of frame 14 are within the scope of the invention described herein. For example, the frame 14 may be formed from more or less frame members than described above and shown in FIG. 4, and the frame 14 may be shaped differently than shown in FIG. 4.

Figure 5:
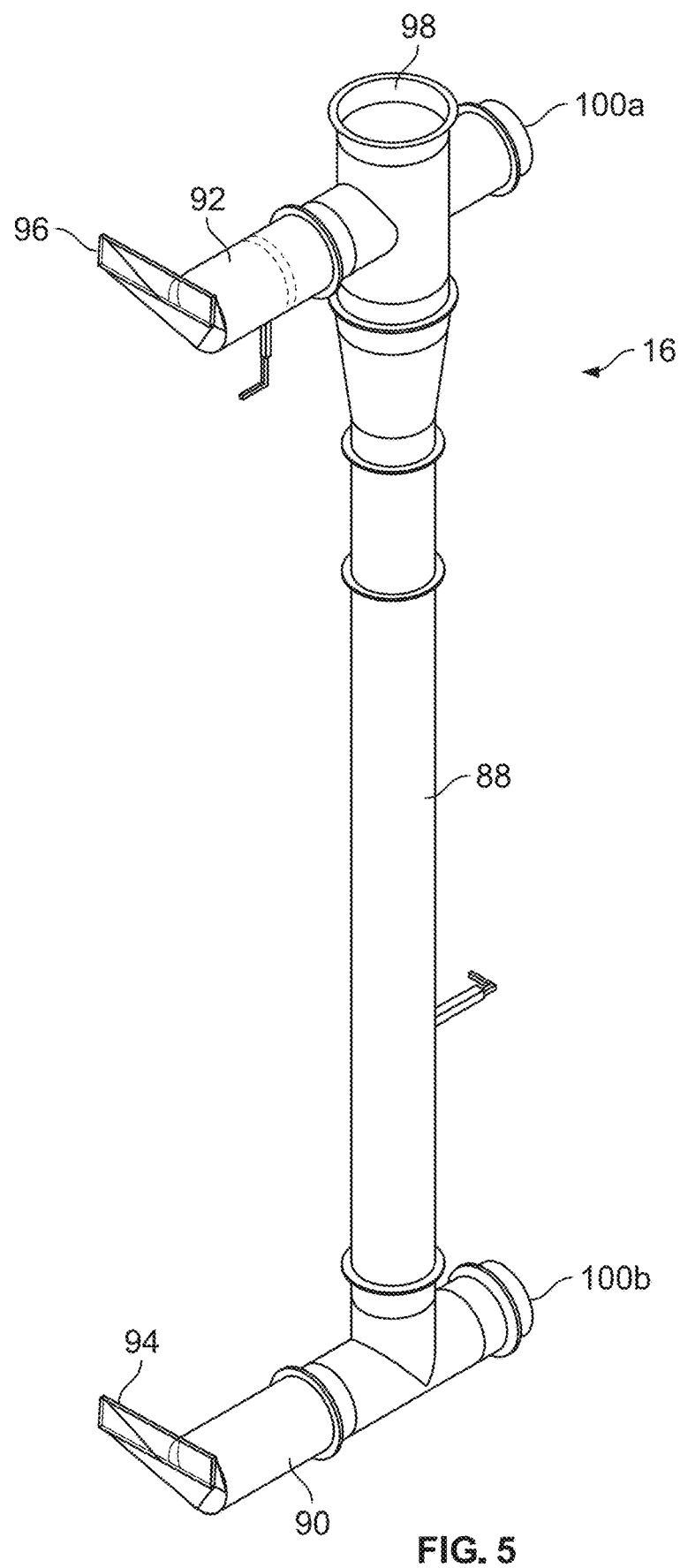
FIG. 5 is a perspective view of a first heating, ventilation, and air conditioning ("HVAC") conduit assembly of the modular utility system shown in FIG. 1.

The first HVAC conduit assembly 16, shown in FIG. 5, may be for exhausting air from the jail cells 12*a,b*. The first HVAC conduit assembly 16 is formed from typical HVAC ductwork and includes a main section 88 that extends vertically from a lower end to an upper end. A lower branch section 90 and an upper branch section 92 each extend generally perpendicular from the main section 88. Boots 94, 96 at the ends of the lower and upper branch sections 90, 92, respectively, are configured for mounting to air outlets on the rear wall 36 of the jail cell assembly 12. The lower branch section 90 may receive air from the lower jail cell 12*b*, and the upper branch section 92 may receive air from the upper jail cell 12*a*. The main section 88 has an upper opening 98 for connection to the HVAC exhaust ducting of the facility where jail cell assembly 12 is located. Clean out or access ports 100*a,b* extend from main section 88 in an opposite direction as branch sections 90, 92.

Figure 6:
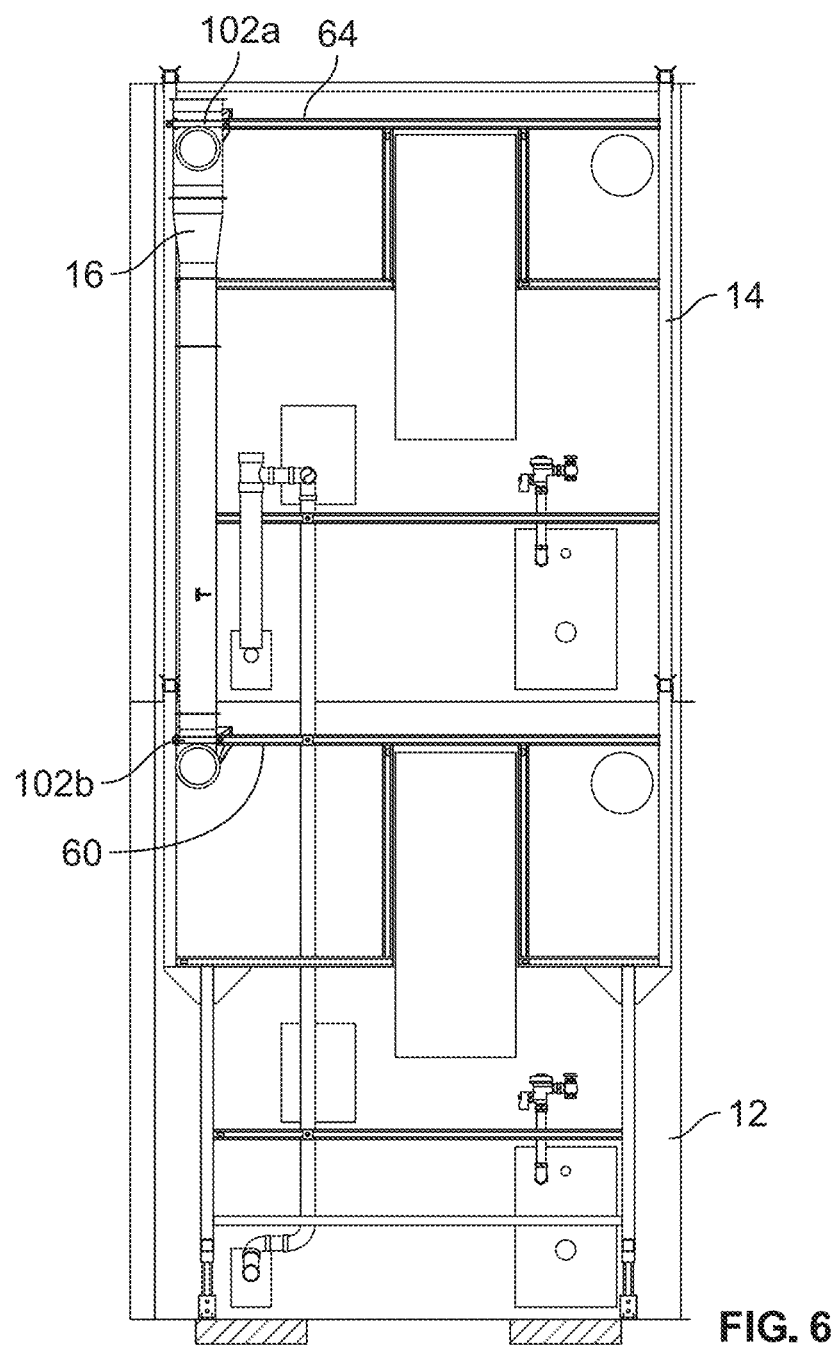
FIG. 6 is a rear elevational view showing the first HVAC conduit assembly mounted to the frame.

FIG. 6 shows the positioning of first HVAC conduit assembly 16 on frame 14. The first HVAC conduit assembly 16 is mounted to the side of frame 14 facing away from jail cell assembly 12 with mounts 102*a* and 102*b*. Mount 102*a* adjustably mounts to frame member 64, and mount 102*b* adjustably mounts to frame member 60. The mounts 102*a,b* are described in more detail below in connection with FIG. 24.

Figure 7:
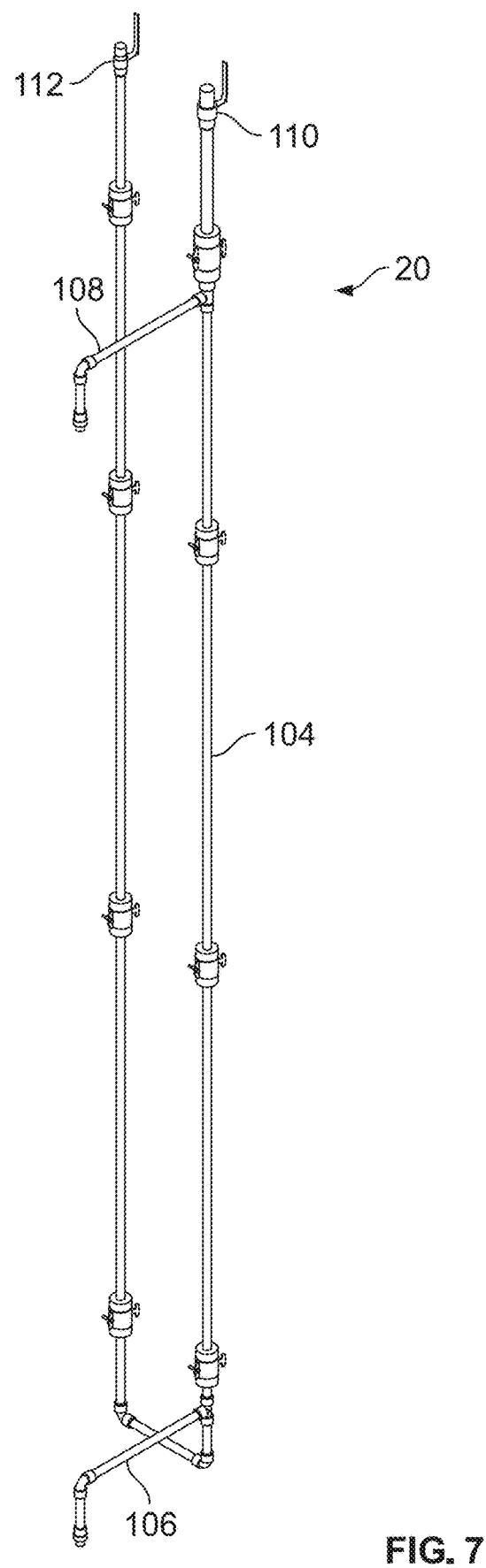
FIG. 7 is a perspective view of a first water conduit assembly of the modular utility system shown in FIG. 1.

Referring to FIG. 7, the first water conduit assembly 20 may be for delivering hot water to the showers 46 of the jail cells 12*a,b*. The first water conduit assembly 20 is formed from typical water lines (e.g., PEX or copper) and includes a main section 104 that extends vertically from an upper end to a lower end where it loops back around to the upper end forming a U-shaped configuration. A lower branch section 106 and an upper branch section 108 each extend generally perpendicular from the main section 104. Suitable fittings at the ends of the lower and upper branch sections 106, 108 are configured for mounting to water inlets adjacent the rear wall 36 of the jail cell assembly 12. The lower branch section 106 may deliver hot water to the shower 46 of the lower jail cell 12*b*, and the upper branch section 108 may deliver hot water to the shower 46 of the upper jail cell 12*a*. The main section 104 has a first valve 110 at its upper end that may be connected to a hot water supply line of the facility where jail cell assembly 12 is located. A second valve 112 at the upper end of main section 104 may be connected to a hot water return line.

Figure 8:
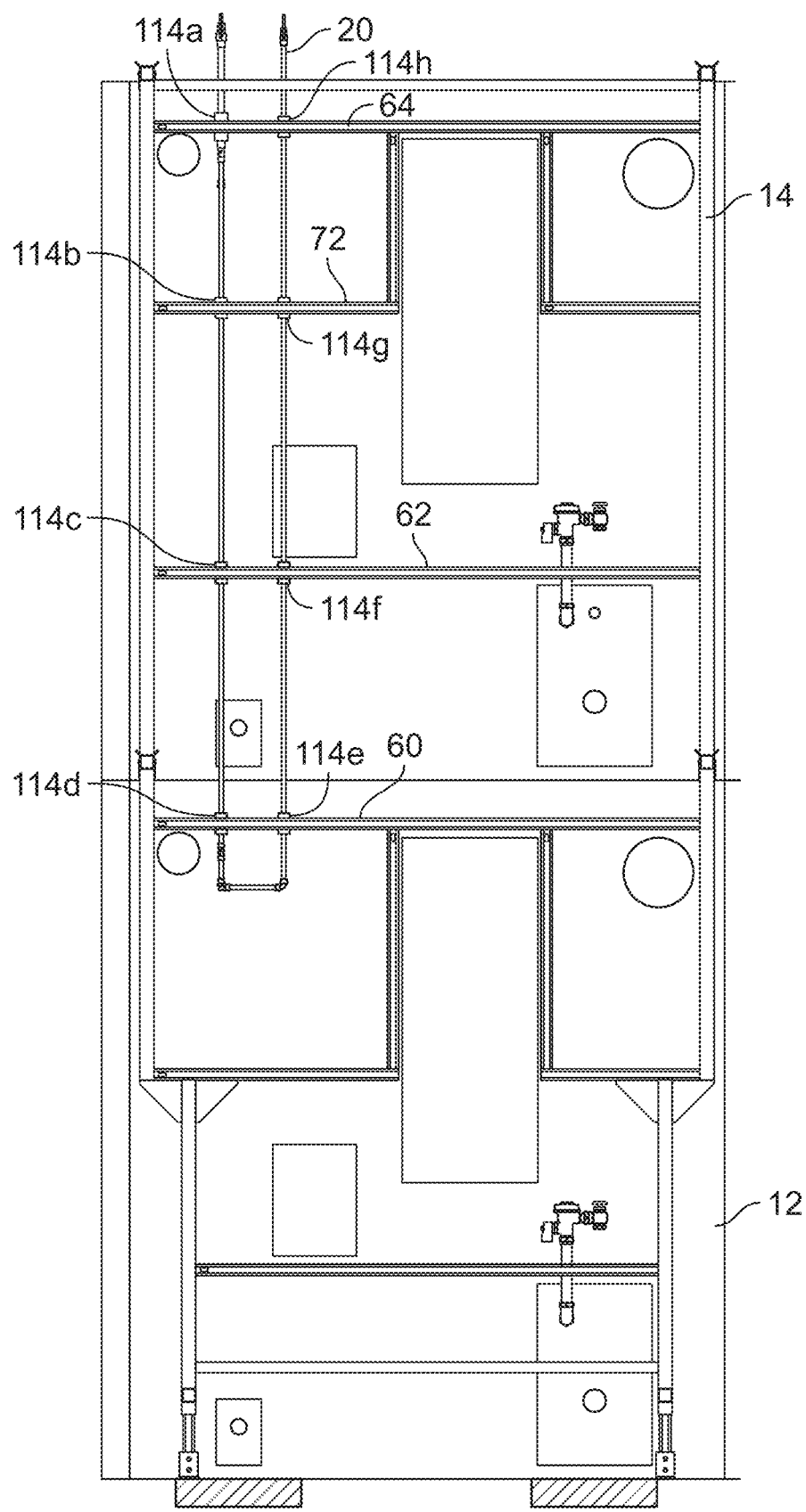
FIG. 8 is a rear elevational view showing the first water conduit assembly mounted to the frame.

FIG. 8 shows the positioning of first water conduit assembly 20 on frame 14. The first water conduit assembly 20 is mounted to the side of frame 14 facing jail cell assembly 12 with mounts 114*a-h*. Mounts 114*a,h* adjustably mount to frame member 64, mounts 114*b,g* adjustably mount to frame member 72, mounts 114*c,f* adjustably mount to frame member 62, and mounts 114*d,e* adjustably mount to frame member 60. The mounts 114*a-h* are described in more detail below in connection with FIG. 25.

Referring to FIG. 9, the first DWV conduit assembly 28 may be for receiving wastewater and venting sewer gas from the showers 46 of the jail cells 12*a,b*. The first DWV conduit assembly 28 is formed from typical DWV lines (e.g., PVC) and includes a main section 116 that extends vertically from an upper end to a lower end. A lower branch section 118 and an upper branch section 120 each extend generally perpendicular from the main section 116. Suitable fittings at the ends of the lower and upper branch sections 118, 120 are configured for mounting to DWV outlets adjacent the rear wall 36 of the jail cell assembly 12. The lower branch section 118 may receive wastewater from the shower 46 of the lower jail cell 12*b*, and the upper branch section 120 may receive wastewater from the shower 46 of the upper jail cell 12*a*. The main section 116 has an opening 122 at its upper end that may be connected to a DWV venting system of the facility where jail cell assembly 12 is located. The main section 116 has an opening 124 at its lower end that may be connected to the DWV main lines of the facility where jail cell assembly 12 is located. A vent line 126 is connected between the lower branch section 118 and a portion of the main section 116 above the upper branch section 120.

FIG. 10 shows the positioning of first DWV conduit assembly 28 on frame 14. The main section 116 of the first DWV conduit assembly 28 is mounted to the side of frame 14 facing away from jail cell assembly 12 with mounts 128*a-e*, and the vent line 126 is mounted to the side of frame 14 facing jail cell assembly 12 with mounts 128*f-h* (FIG. 9). Mount 128*a* adjustably mounts to frame member 72, mount 128*b* adjustably mounts to frame member 60, mount 128*c* adjustably mounts to frame member 50*b*, and mount 128*e* adjustably mounts to frame member 58. Further mounts 128*f-h*, shown in FIG. 9, adjustably mount to frame members 62, 60, and 58, respectively. The mounts 128*a-h* are described in more detail below in connection with FIG. 26.

Figure 11:
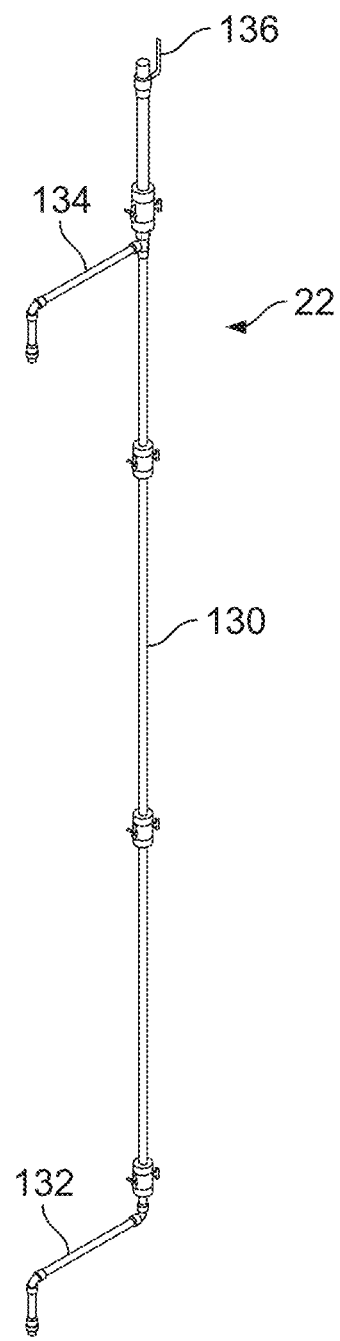
FIG. 11 is a perspective view of a second water conduit assembly of the modular utility system shown in FIG. 1.

As shown in FIG. 11, the second water conduit assembly 22 may be for delivering cold water to the showers 46 of the jail cells 12*a,b*. The second water conduit assembly 22 is formed from typical water lines (e.g., PEX or copper) and includes a main section 130 that extends vertically from an upper end to a lower end. A lower branch section 132 and an upper branch section 134 each extend generally perpendicular from the main section 130. Suitable fittings at the ends of the lower and upper branch sections 132, 134 are configured for mounting to water inlets adjacent the rear wall 36 of the jail cell assembly 12. The lower branch section 132 may deliver cold water to the shower 46 of the lower jail cell 12*b*, and the upper branch section 134 may deliver cold water to the shower 46 of the upper jail cell 12*a*. The main section 130 has a valve 136 at its upper end that may be connected to a cold water supply line of the facility where jail cell assembly 12 is located.

Figure 12:
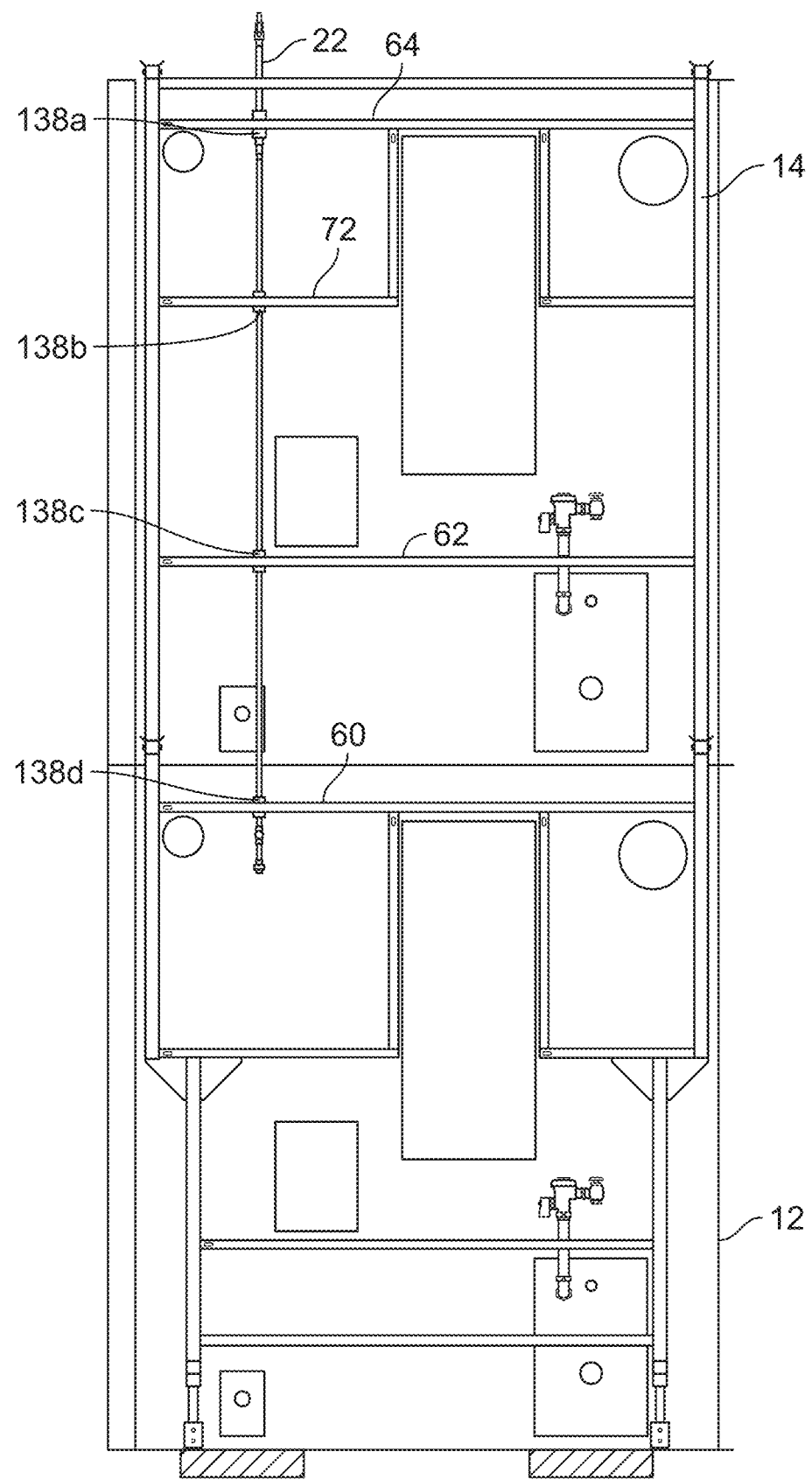
FIG. 12 is a rear elevational view showing the second water conduit assembly mounted to the frame.

FIG. 12 shows the positioning of second water conduit assembly 22 on frame 14. The second water conduit assembly 22 is mounted to the side of frame 14 facing jail cell assembly 12 with mounts 138*a-d*. Mount 138*a* adjustably mounts to frame member 64, mount 138*b* adjustably mounts to frame member 72, mount 138*c* adjustably mounts to frame member 62, and mount 138*d* adjustably mounts to frame member 60. The mounts 138*a-d* are described in more detail below in connection with FIG. 25.

Figure 13:
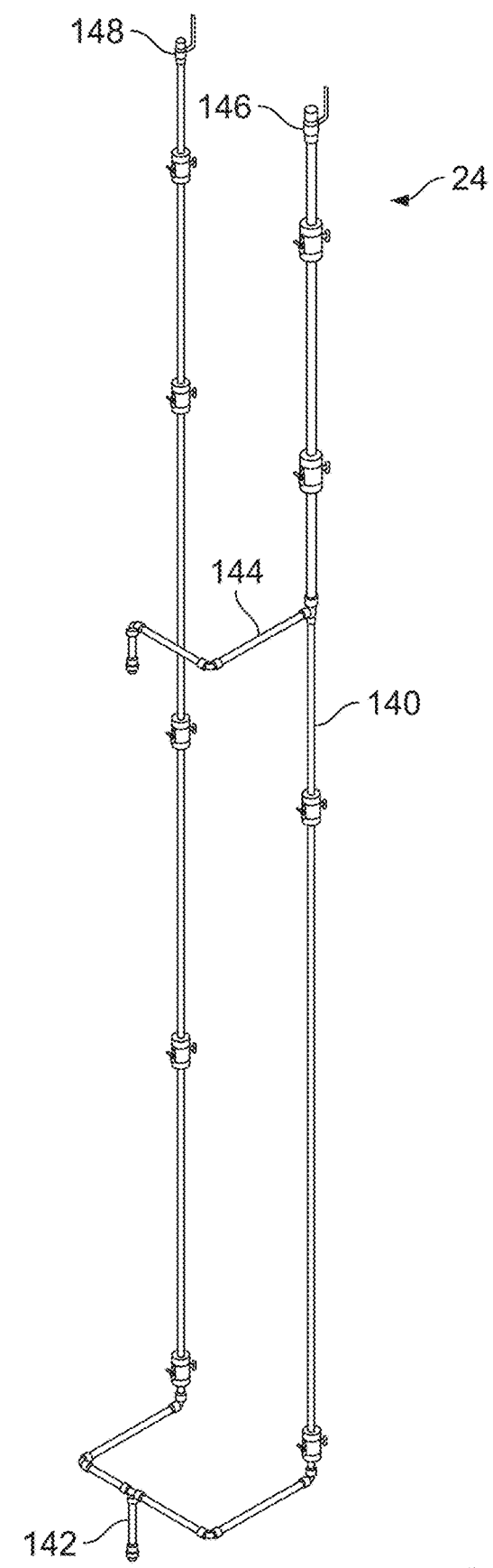
FIG. 13 is a perspective view of a third water conduit assembly of the modular utility system shown in FIG. 1.

Referring to FIG. 13, the third water conduit assembly 24 may be for delivering hot water to the sink portion of the combination sink/toilets 44 of the jail cells 12*a,b*. The third water conduit assembly 24 is formed from typical water lines (e.g., PEX or copper) and includes a main section 140 that extends vertically from an upper end to a lower end where it loops back around to the upper end forming a U-shaped configuration. A lower branch section 142 and an upper branch section 144 each extend generally perpendicular from the main section 140. Suitable fittings at the ends of the lower and upper branch sections 142, 144 are configured for mounting to water inlets adjacent the rear wall 36 of the jail cell assembly 12. The lower branch section 142 may deliver hot water to the combination sink/toilet 44 of the lower jail cell 12*b*, and the upper branch section 144 may deliver hot water to the combination sink/toilet 44 of the upper jail cell 12*a*. The main section 140 has a first valve 146 at its upper end that may be connected to a hot water supply line of the facility where jail cell assembly 12 is located. A second valve 148 at the upper end of main section 140 may be connected to a hot water return line.

Figure 14:
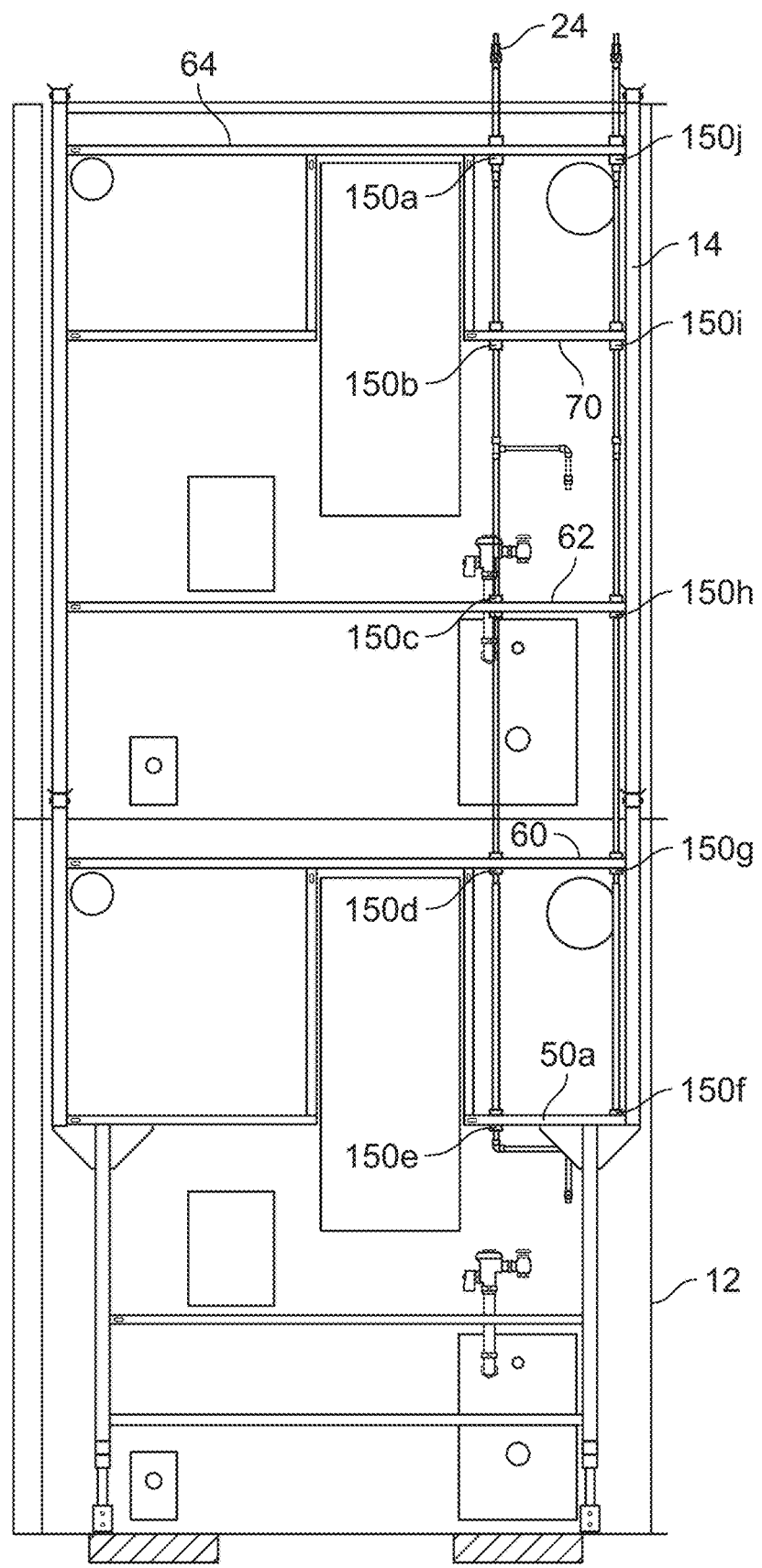
FIG. 14 is a rear elevational view showing the third water conduit assembly mounted to the frame.

FIG. 14 shows the positioning of third water conduit assembly 24 on frame 14. The third water conduit assembly 24 is mounted to the side of frame 14 facing jail cell assembly 12 with mounts 150*a-j*. Mounts 150*a,j* adjustably mount to frame member 64, mounts 150*b,i* adjustably mount to frame member 70, mounts 150*c,h* adjustably mount to frame member 62, mounts 150*d,g* adjustably mount to frame member 60, and mounts 150*e,f* adjustably mount to frame member 50*a*. The mounts 150*a-j* are described in more detail below in connection with FIG. 25.

Figure 15:
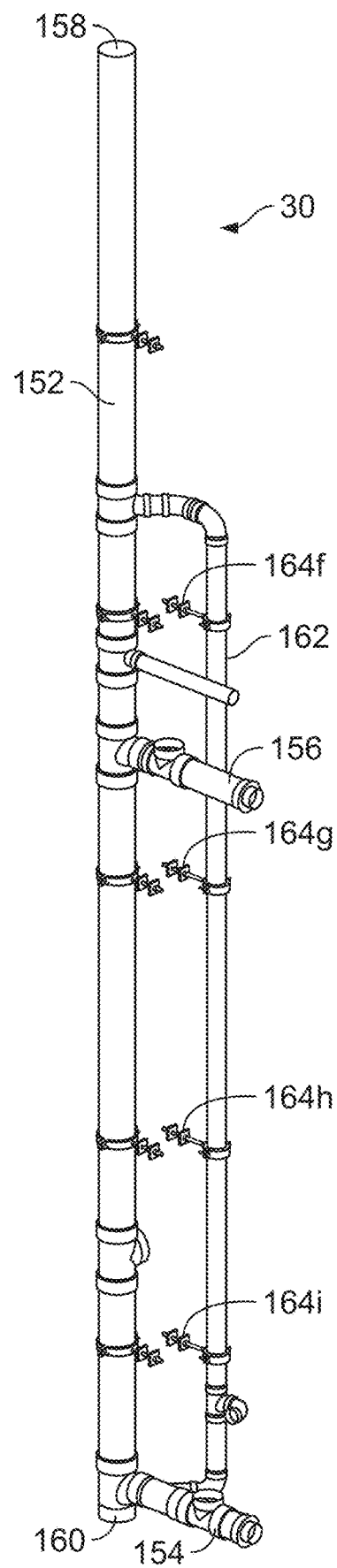
FIG. 15 is a perspective view of a second DWV conduit assembly of the modular utility system shown in FIG. 1.

Referring to FIG. 15, the second DWV conduit assembly 30 may be for receiving wastewater and venting sewer gas from the combination sink/toilets 44 of the jail cells 12*a,b*. The second DWV conduit assembly 30 is formed from typical DWV lines (e.g., PVC) and includes a main section 152 that extends vertically from an upper end to a lower end. A lower branch section 154 and an upper branch section 156 each extend generally perpendicular from the main section 152. Suitable fittings at the ends of the lower and upper branch sections 154, 156 are configured for mounting to DWV outlets adjacent the rear wall 36 of the jail cell assembly 12. The lower branch section 154 may receive wastewater from the combination sink/toilet 44 of the lower jail cell 12*b*, and the upper branch section 156 may receive wastewater from the combination sink/toilet 44 of the upper jail cell 12*a*. The main section 152 has an opening 158 at its upper end that may be connected to a DWV venting system of the facility where jail cell assembly 12 is located. The main section 152 has an opening 160 at its lower end that may be connected to the DWV main lines of the facility where jail cell assembly 12 is located. A vent line 162 is connected between the lower branch section 154 and a portion of the main section 152 above the upper branch section 156.

Figure 16:
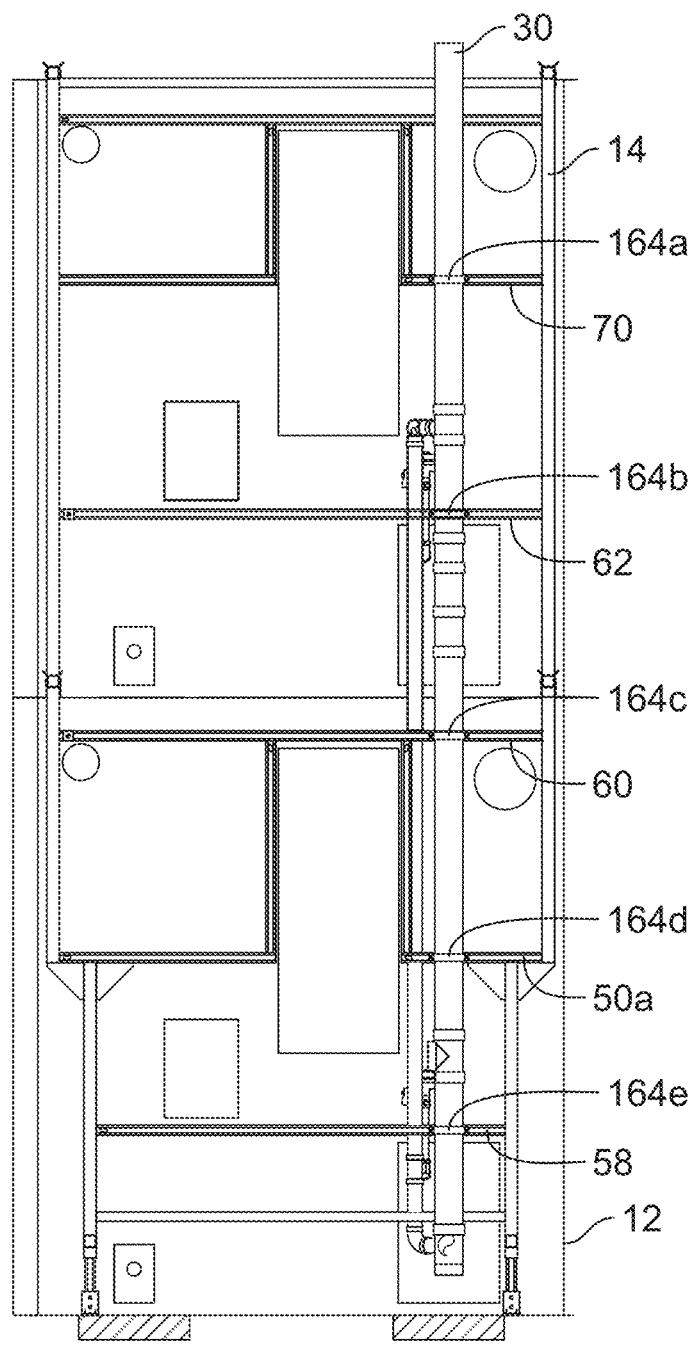
FIG. 16 is a rear elevational view showing the second DWV conduit assembly mounted to the frame.

FIG. 16 shows the positioning of second DWV conduit assembly 30 on frame 14. The main section 152 of the second DWV conduit assembly 30 is mounted to the side of frame 14 facing away from jail cell assembly 12 with mounts 164*a-e*, and the vent line 162 is mounted to the side of frame 14 facing jail cell assembly 12 with mounts 164*f-i* (FIG. 15). Mount 164*a* adjustably mounts to frame member 70, mount 164*b* adjustably mounts to frame member 62, mount 164*c* adjustably mounts to frame member 60, mount 164*d* adjustably mounts to frame member 50*a*, and mount 164*e* adjustably mounts to frame member 58. Further mounts 164*f-i*, shown in FIG. 15, adjustably mount to frame members 62, 60, 50*a*, and 58, respectively. The mounts 164*a-i* are described in more detail below in connection with FIG. 26.

Figure 17:
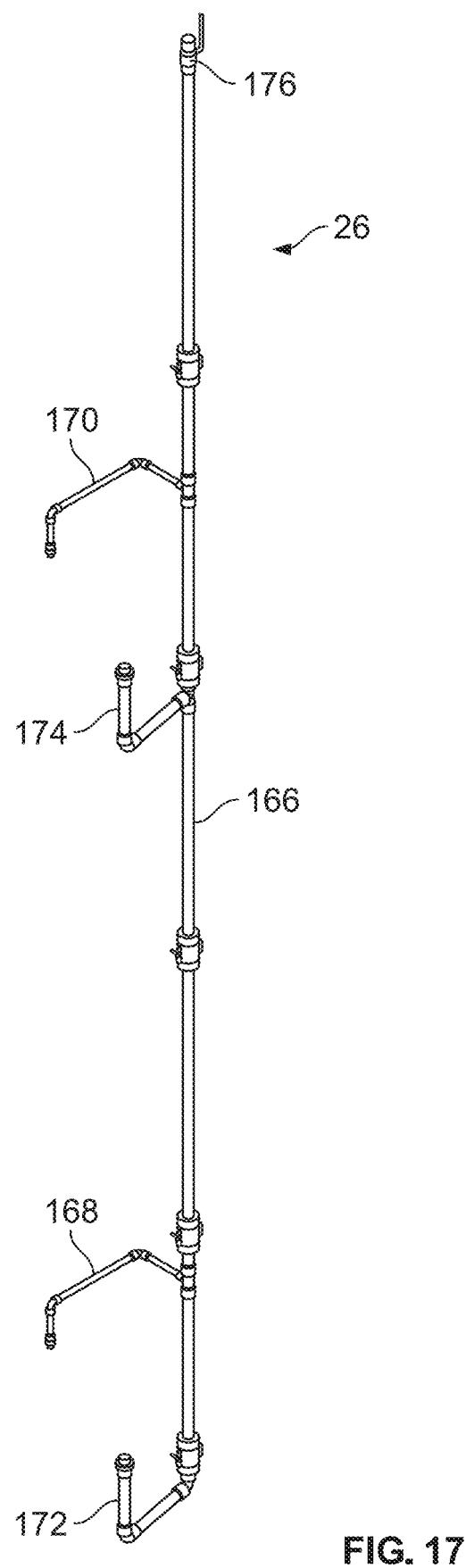
FIG. 17 is a perspective view of a fourth water conduit assembly of the modular utility system shown in FIG. 1.

As shown in FIG. 17, the fourth water conduit assembly 26 may be for delivering cold water to the combination sink/toilets 44 of the jail cells 12*a,b*. The fourth water conduit assembly 26 is formed from typical water lines (e.g., PEX or copper) and includes a main section 166 that extends vertically from an upper end to a lower end. A lower sink branch section 168 and an upper sink branch section 170 each extend generally perpendicular from the main section 166. Suitable fittings at the ends of the lower and upper sink branch sections 168, 170 are configured for mounting to sink water inlets adjacent the rear wall 36 of the jail cell assembly 12. The lower sink branch section 168 may deliver cold water to the combination sink/toilet 44 of the lower jail cell 12*b*, and the upper sink branch section 170 may deliver cold water to the combination sink/toilet 44 of the upper jail cell 12*a*. A lower toilet branch section 172 and an upper toilet branch section 174 each extend generally perpendicular from the main section 166. Suitable fittings at the ends of the lower and upper toilet branch sections 172, 174 are configured for mounting to toilet water inlets adjacent the rear wall 36 of the jail cell assembly 12. The lower toilet branch section 172 may deliver cold water to the combination sink/toilet 44 of the lower jail cell 12*b*, and the upper toilet branch section 174 may deliver cold water to the combination sink/toilet 44 of the upper jail cell 12*a*. The main section 130 has a valve 176 at its upper end that may be connected to a cold water supply line of the facility where jail cell assembly 12 is located.

Figure 18:
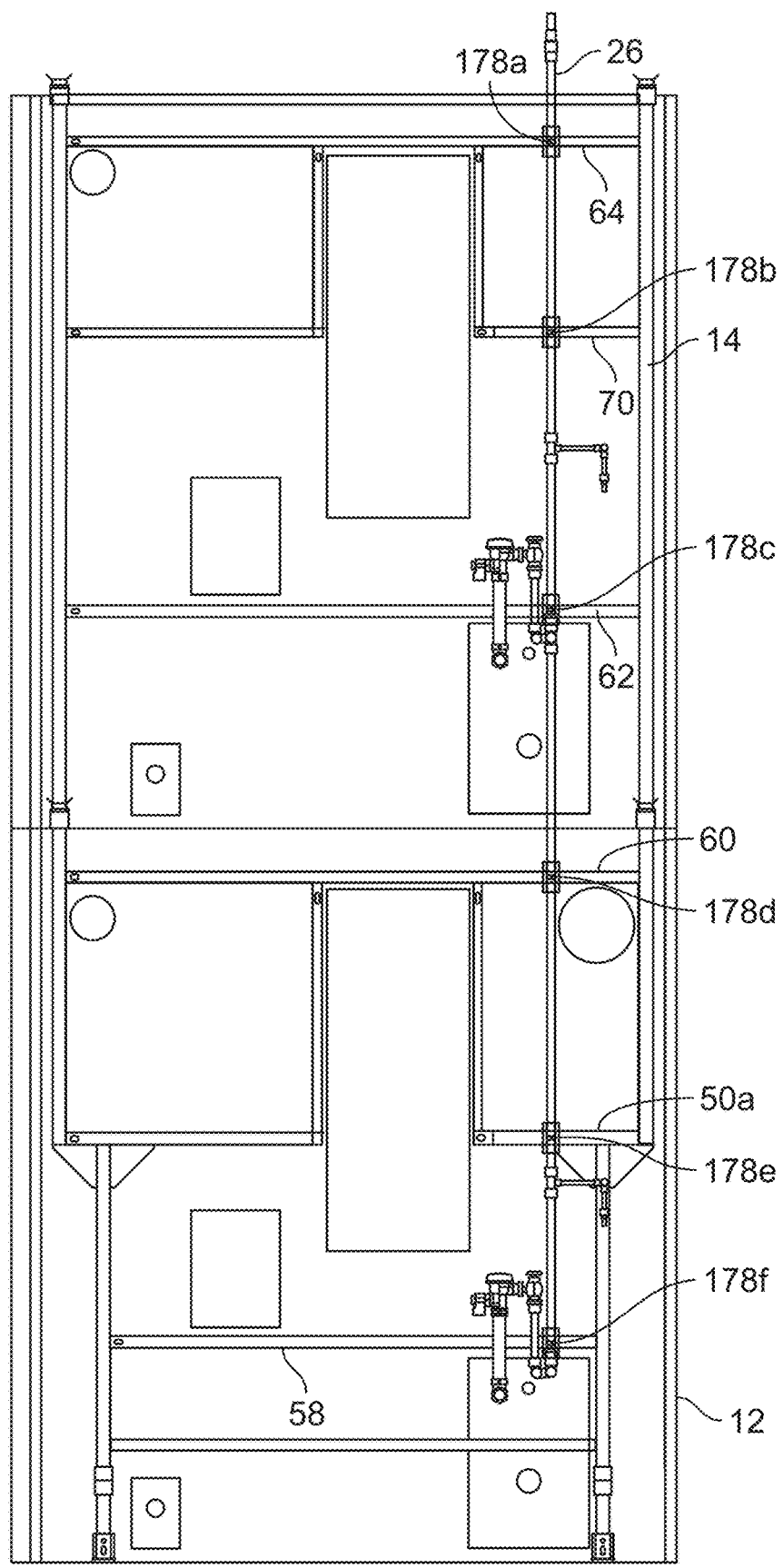
FIG. 18 is a rear elevational view showing the fourth water conduit assembly mounted to the frame.

FIG. 18 shows the positioning of fourth water conduit assembly 26 on frame 14. The fourth water conduit assembly 26 is mounted to the side of frame 14 facing jail cell assembly 12 with mounts 178a-f. Mount 178a adjustably mounts to frame member 64, mount 178b adjustably mounts to frame member 70, mount 178c adjustably mounts to frame member 62, mount 178d adjustably mounts to frame member 60, mount 178e adjustably mounts to frame member 50a, and mount 178f adjustably mounts to frame member 58. The mounts 178a-f are described in more detail below in connection with FIG. 25.

Figure 19:
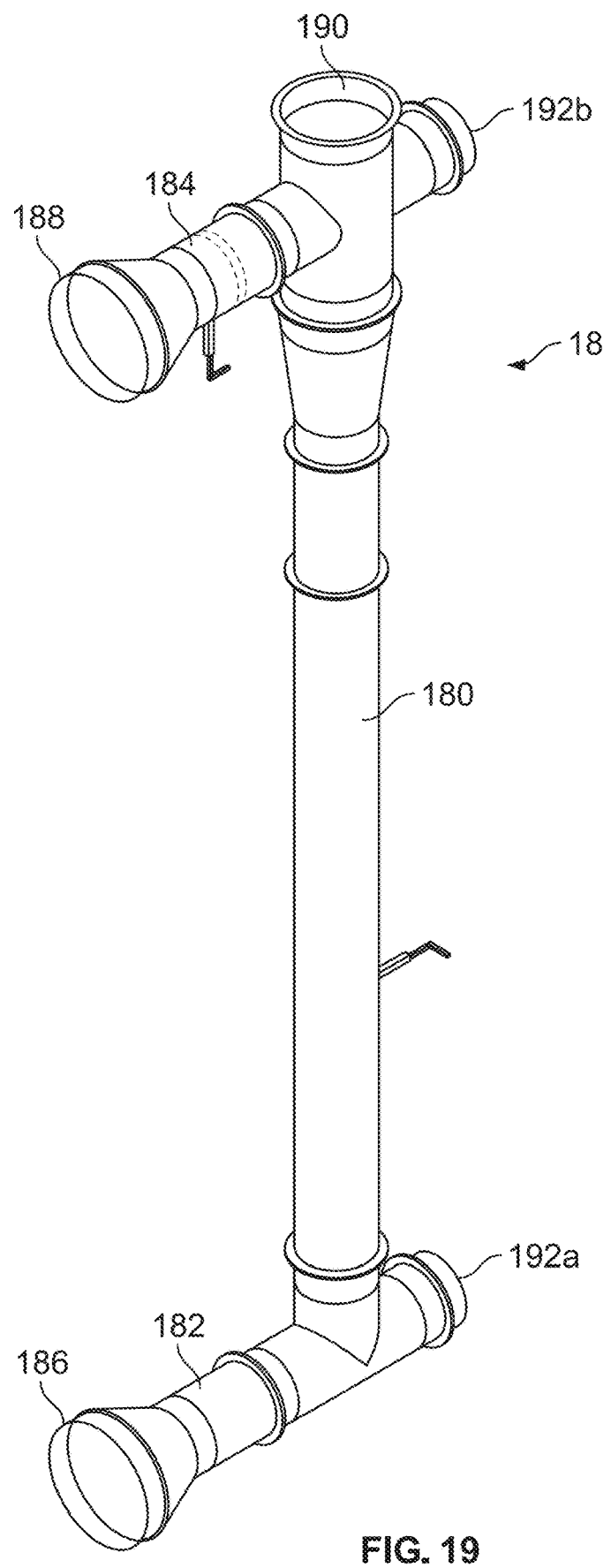
FIG. 19 is a perspective view of a second HVAC conduit assembly of the modular utility system shown in FIG. 1.

The second HVAC conduit assembly 18, shown in FIG. 19, may be for supplying conditioned and/or heated air to the jail cells 12a,b. The second HVAC conduit assembly 18 is formed from typical HVAC ductwork and includes a main section 180 that extends vertically from a lower end to an upper end. A lower branch section 182 and an upper branch section 184 each extend generally perpendicular from the main section 180. Boots 186, 188 at the ends of the lower and upper branch sections 182, 184, respectively, are configured for mounting to air inlets on the rear wall 36 of the jail cell assembly 12. The lower branch section 182 may supply air to the lower jail cell 12b, and the upper branch section 184 may supply air to the upper jail cell 12a. The main section 180 has an upper opening 190 for connection to the HVAC supply ducting of the facility where jail cell assembly 12 is located. Clean out or access ports 192a,b extend from main section 180 in an opposite direction as branch sections 182, 184.

Figure 20:
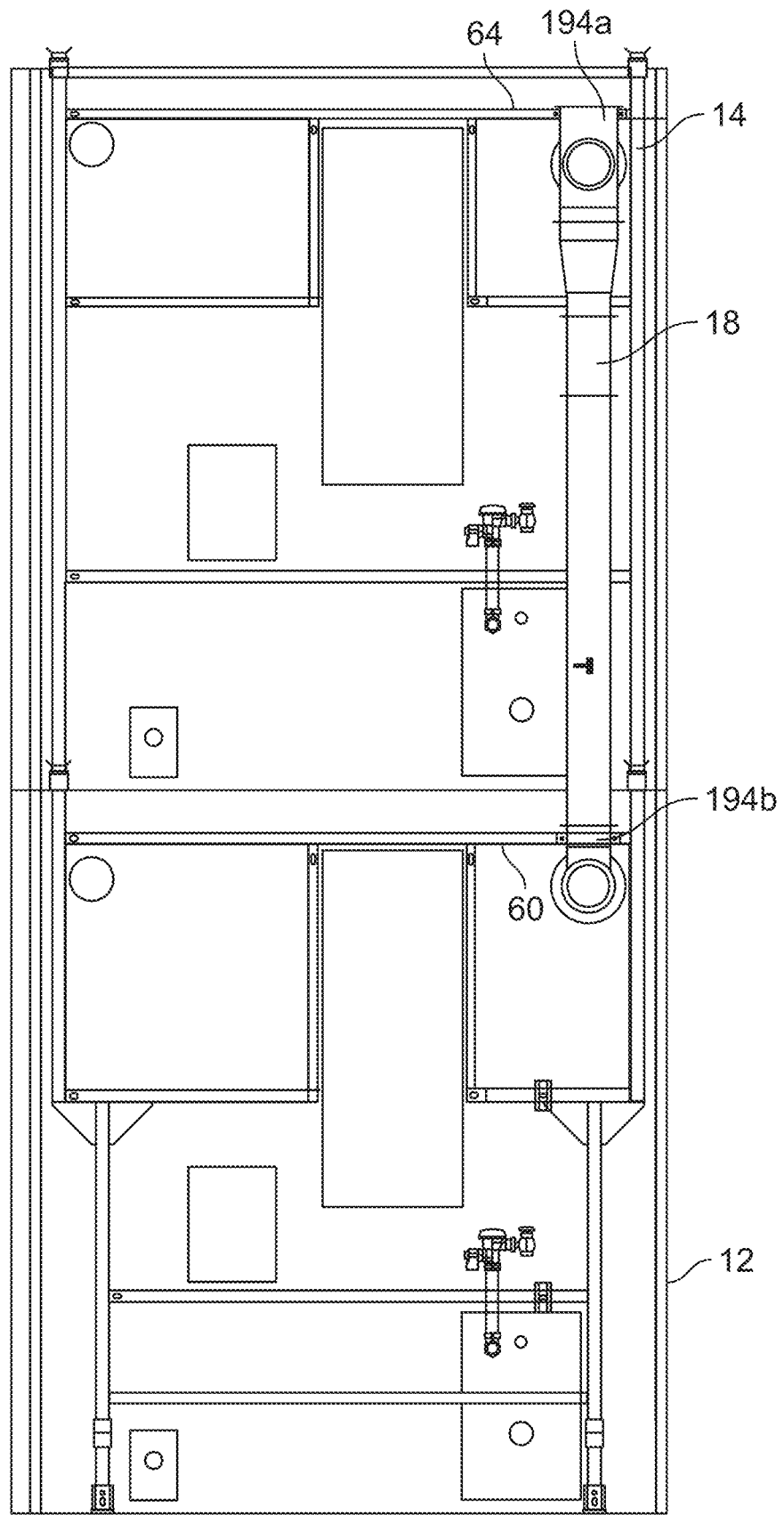
FIG. 20 is a rear elevational view showing the second HVAC conduit assembly mounted to the frame.

FIG. 20 shows the positioning of second HVAC conduit assembly 18 on frame 14. The second HVAC conduit assembly 18 is mounted to the side of frame 14 facing away from jail cell assembly 12 with mounts 194a and 194b. Mount 194a adjustably mounts to frame member 64, and mount 194b adjustably mounts to frame member 60. The mounts 194a,b are described in more detail below in connection with FIG. 24.

Figure 21:
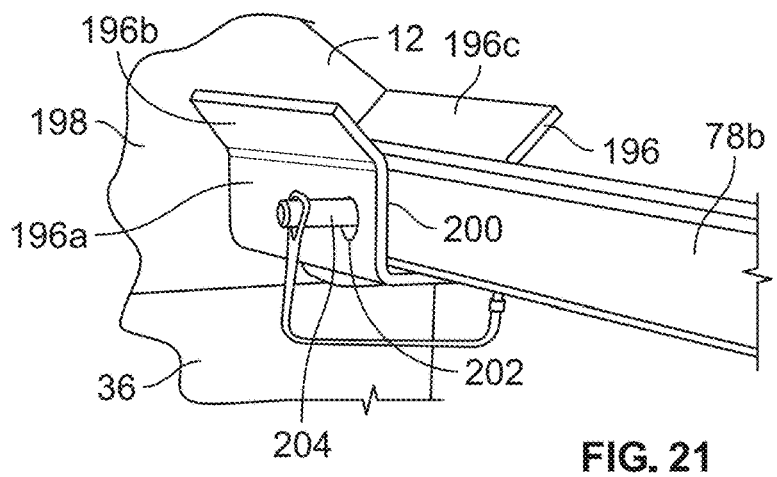
FIG. 21 is a perspective view of a connection between the frame and an upper frame mount that is joined to an upper surface of the jail cell.
Figure 22:
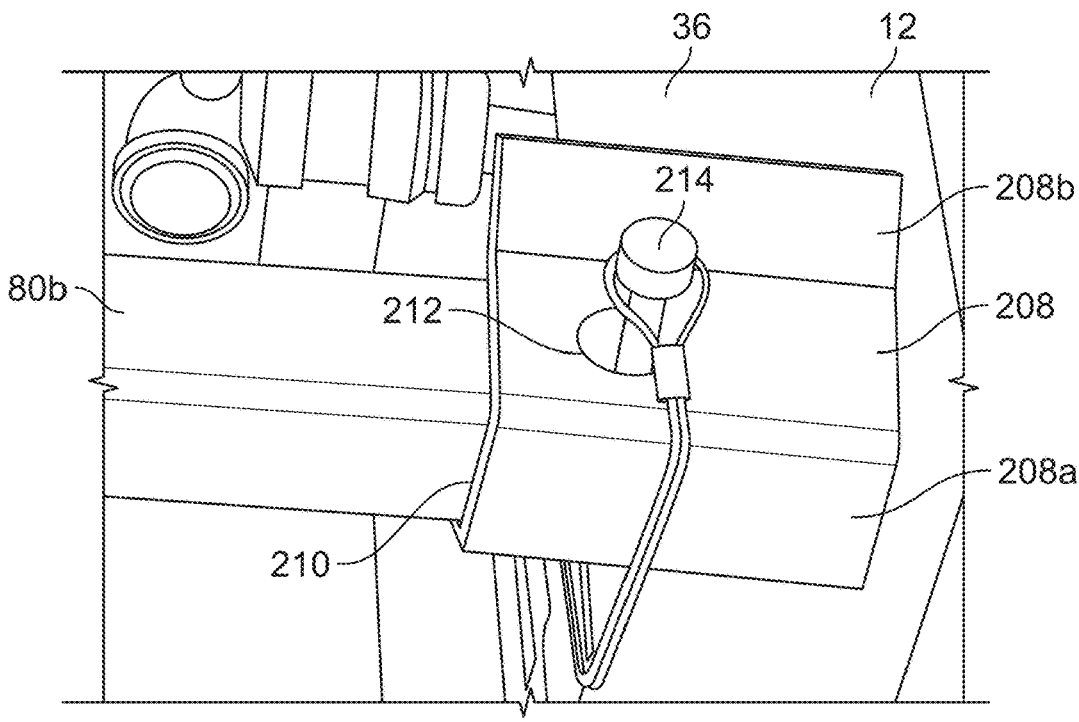
FIG. 22 is a perspective view of a connection between the frame and a middle frame mount that is joined to a rear wall of the jail cell.
Figure 23:
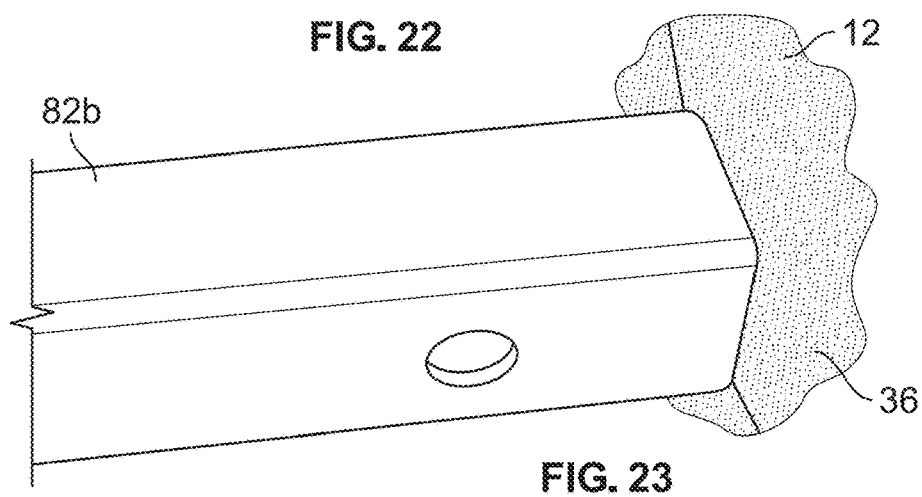
FIG. 23 is a perspective view of a connection between the frame and the rear wall of the jail cell.

Referring now to FIGS. 21-23, details of the connection between the frame 14 and the jail cell assembly 12 are described below. Although one exemplary manner of connecting the frame 14 to the jail cell assembly 12 is shown in FIGS. 21-23 and described below, it is within the scope of the invention for the frame 14 to be connected to the jail cell assembly 12 or other desired structure in any suitable manner.

FIG. 21 shows a frame mount 196 that is joined by welding or other suitable method to an upper wall 198 of the jail cell assembly 12. The position of frame mount 196 on jail cell assembly 12 is shown in FIG. 1. The frame mount 196 includes a lower section 196a that has a U-shaped cross-section for receiving and supporting the frame member 78b of frame 14. A bottom surface of the lower section 196a is joined to and supported by the upper wall 198 of the jail cell assembly 12. Guides 196b,c extend upward and outward at an angle from the upper edges of the lower section 196a. As the frame member 78b is lowered into the channel 200 defined by the lower section 196a of the frame mount 196, the guides 196b,c may be contacted by the frame member 78b and assist in sliding the frame member 78b into place within the channel 200. Upper edges of the guides 196b,c are spaced apart from each other farther than the upper edges of the lower section 196a so that the frame member 78b does not need to be perfectly positioned above the lower section 196a as it is lowered into place in the channel 200. When the frame member 78b is positioned in the channel 200, an opening (not shown) that extends through the side of the frame member 78b is aligned with an opening 202 that extends through the lower section 196a of the frame mount 196. A hitch pin 204 is insertable through the openings of the frame member 78b and frame mount 196 to retain the frame member 78b in place within the channel 200. Another frame mount 206, shown in FIG. 1, is mounted to the upper wall 198 of the jail cell assembly 12 for receiving and supporting the frame member 78a (FIG. 4) in the same manner as described above with respect to frame mount 196.

FIG. 22 shows the connection between the frame member 80b and the jail cell assembly 12. A frame mount 208 is joined by welding or other suitable method to the rear wall 36 of the jail cell assembly 12. The position of frame mount 208 on jail cell assembly 12 is shown in FIG. 2. The frame mount 208 includes a lower section 208a that has a U-shaped cross-section for receiving and supporting the frame member 80b of frame 14. An end surface of the lower section 208a is joined to the rear wall 36 of the jail cell assembly 12. Guides, one of which is shown as 208b, extend upward and outward at an angle from the upper edges of the lower section 208a in a similar manner as described above for frame mount 196. As the frame member 80b is lowered into the channel 210 defined by the lower section 208a of the frame mount 208, the guides 208b may be contacted by the frame member 80b and assist in sliding the frame member 80b into place within the channel 210 in the same manner as described above with respect to frame member 78b. Upper edges of the guides 208b are spaced apart from each other farther than the upper edges of the lower section 208a so that the frame member 80b does not need to be perfectly positioned above the lower section 208a as it is lowered into place in the channel 210. When the frame member 80b is positioned in the channel 210, an opening (not shown) that extends through the side of the frame member 80b is aligned with an opening 212 that extends through the lower section 208a of the frame mount 208. A hitch pin 214 is insertable through the openings of the frame member 80b and frame mount 208 to retain the frame member 80b in place within the channel 210. Another frame mount 216, shown in FIG. 1, is mounted to the rear wall 36 of the jail cell assembly 12 for receiving and supporting the frame member 80a (FIG. 4) in the same manner as described above with respect to frame mount 208.

FIG. 23 shows the connection between the frame member 82b and the rear wall 36 of the jail cell assembly 12. When the frame members 78a,b and 80a,b are received by and joined to the frame mounts 196, 206, 208, and 216, the frame member 82b abuts the rear wall 36, as shown in FIG. 23. The frame member 82b may be joined to the rear wall 36 by welding or other suitable connection method to securely connect the frame member 82b to the jail cell assembly 12. The frame member 82a (FIG. 4) is joined to the rear wall 36 in the same manner as frame member 82b. The position of frame members 82a,b when joined to the rear wall 36 is shown in FIG. 1 for frame member 82a and FIG. 2 for frame member 82b.

The adjustable connections between the frame 14 and first HVAC conduit assembly 16, second HVAC conduit assembly 18, first water conduit assembly 20, second water conduit assembly 22, third water conduit assembly 24, fourth water conduit assembly 26, first DWV conduit assembly 28, and second DWV conduit assembly 30 are described below with reference to FIGS. 24-26. Although exemplary manners of connecting the frame 14 to these conduit assemblies is shown in FIGS. 24-26 and described below, it is within the scope of the invention for the frame 14 to be adjustably connected to these conduit assemblies in any suitable manner within the scope of the claimed invention.

Figure 24:
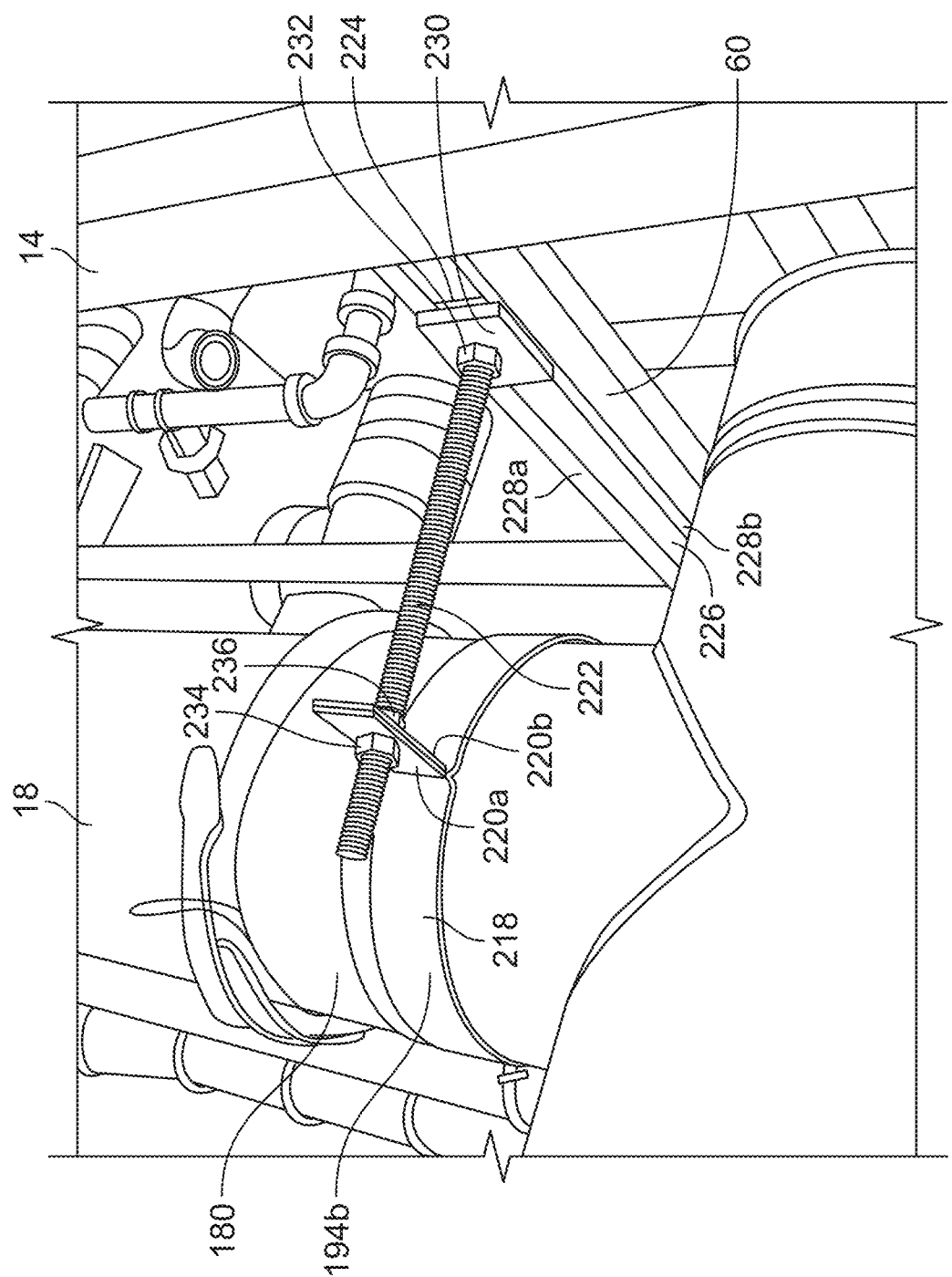
FIG. 24 is a perspective view of a connection between the frame and the second HVAC conduit assembly.

FIG. 24 shows the connection between the second HVAC conduit assembly 18 and the frame member 60 utilizing the mount 194b (FIG. 20). The mount 194b includes an annular band 218 that is sized and configured for wrapping around the main section 180 of the second HVAC conduit assembly 18. Tabs 220a,b extend generally perpendicular outward from the annular band 218. The tabs 220a,b may be spread apart from each other to open the annular band 218 and slide it around the second HVAC conduit assembly 18. Aligned openings in the tabs 220a,b receive a threaded rod 222. As described above and shown in FIG. 24, the frame member 60 is a conventional strut channel. A conventional strut nut 224 is positioned within a channel 226 of the frame member 60. The strut nut 224 engages interior edges of lips 228a,b of the frame member 60 to retain it within the channel 226. The threaded rod 222 threadingly engages a threaded opening (not shown) in the strut nut 224. The threaded rod 222 also passes through an opening in a square strut channel washer 230, which abuts and engages the exterior face of the frame member 60. A nut 232 on the threaded rod 222 allows an installer to rotate the threaded rod 222 and secure the mount 194b to the frame member 60. As the nut 232 is rotated, the strut nut 224 and strut channel washer 230 are tightened against both sides of the lips 228a,b to clamp the lips 228a,b between the strut nut 224 and strut channel washer 230. Nuts 234, 236 are threaded on the threaded rod 222 and are positioned on both sides of the tabs 220a,b. The nuts 234, 236 are threaded into engagement with the tabs 220a,b to tighten the annular band 218 around the ductwork and to retain a desired spacing and position between the second HVAC conduit assembly 18 and the frame member 60.

The second HVAC conduit assembly 18 may be fastened to the frame member 60 with mount 194b when modular utility system 10 is manufactured and assembled at a location distant from the jail cell assembly 12. After the frame 14 is connected to the jail cell assembly 12, as described above, the mount 194b allows the installer to adjust the position of the second HVAC conduit assembly 18 with respect to the mounted frame 14 and the jail cell assembly 12. For example, if the position of the second HVAC conduit assembly 18 must be moved so that it lines up with the HVAC connections of the jail cell assembly 12, the installer may loosen the strut nut 224 by rotating the nut 232. This allows the installer to slide the mount 194b and strut nut 224 laterally within the channel 226. In this manner, and with the mount 194a (FIG. 20) loosened as well, the installer may slide the entire second HVAC conduit assembly 18 laterally with respect to the frame 14 and jail cell assembly 12 in a generally horizontal direction across the width of the rear wall 36 of the jail cell assembly 12. When the second HVAC conduit assembly 18 is in a desired position to where it aligns with HVAC connection points of the jail cell assembly 12, the nut 232 may be tightened as described above. The mount 194b is securable to the frame 14 in a plurality of positions along the horizontal path of movement of the strut nut 224 within the channel 226.

The mount 194b also allows the installer to vertically adjust the second HVAC conduit assembly 18. For example, the nuts 234 and 236 may be loosened to expand the annular band 218 and move it to an open position thereby allowing vertical movement of the second HVAC conduit assembly 18 within the annular band 218. When the second HVAC conduit assembly 18 is in a desired vertical position, the nuts 234 and 236 may be tightened as described above to move the annular band 218 to a closed position in which it clamps around the second HVAC conduit assembly 18 and holds the second HVAC conduit assembly 18 in a set vertical position. The second HVAC conduit assembly 18 is securable to the mount 194b in a plurality of positions along the vertical path of movement of the second HVAC conduit assembly 18 within the mount 194b. Thus, the mount 194b allows horizontal movement of the second HVAC conduit assembly 18 by sliding the strut nut 224 in a first direction with respect to the frame 14 and also vertical movement of the second HVAC conduit assembly 18 through the mount 194b in a second direction that is generally perpendicular to the first direction. The frame members 48a,b, 50a,b, 52a,b, 54, 56, 58, 60, 62, 64, 66, 68, 70, 72, 74, and 76 (FIG. 4) that form the second section of the frame 14 are spaced apart from the rear wall 36 of the jail cell assembly 12 in a third direction that is generally perpendicular to the first direction of movement of the mount 194b with respect to the frame 14 and the second direction of movement of the second HVAC conduit assembly 18 through the mount 194b.

The other mount 194a (FIG. 20) of the second HVAC conduit assembly 18, and the mounts 102a,b (FIG. 6) of the first HVAC conduit assembly 16 are structured and operate in a similar manner as the mount 194b described above and shown in FIG. 24.

Figure 25:
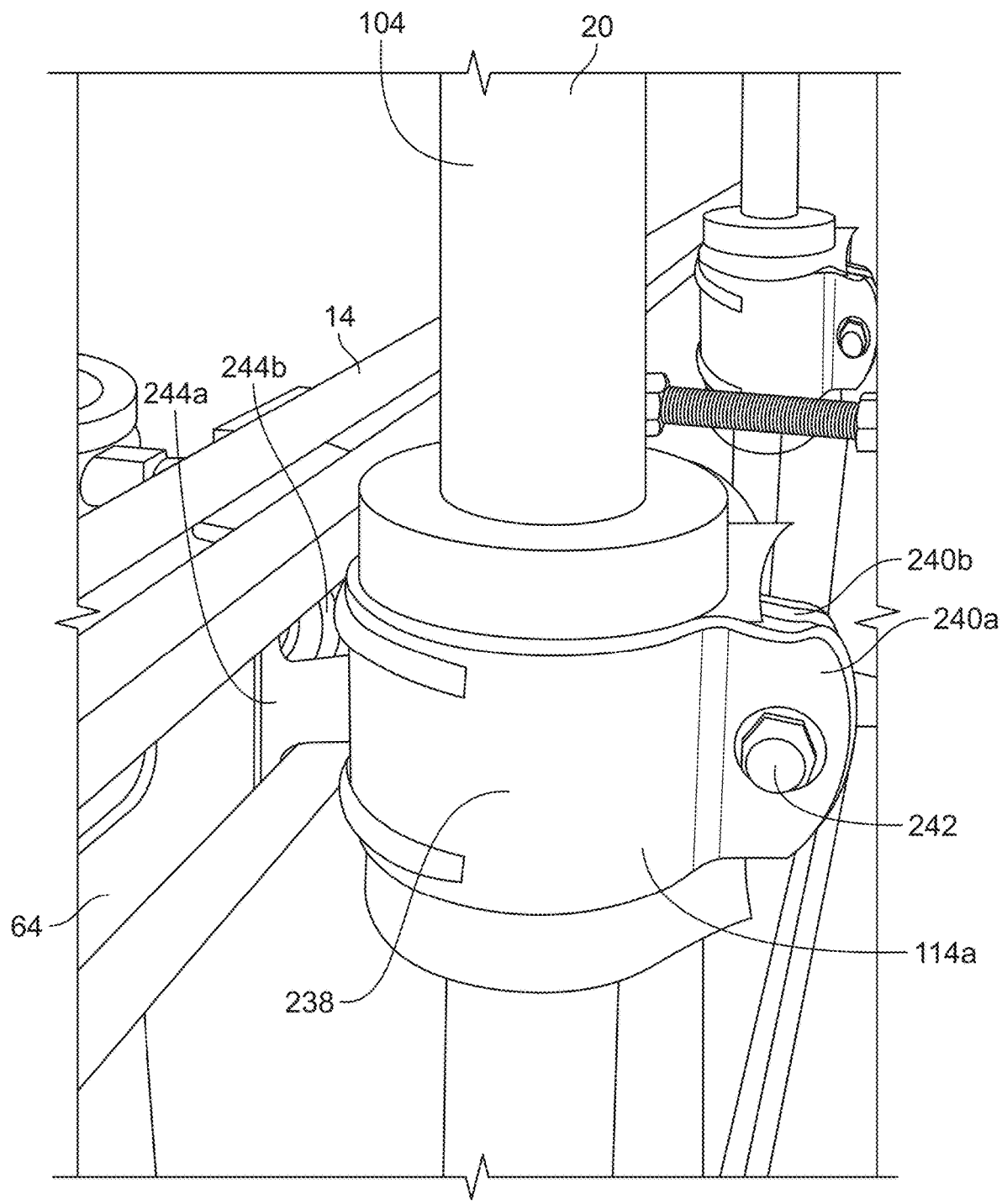
FIG. 25 is a perspective view of a connection between the frame and the first water conduit assembly.

Referring now to FIG. 25, first water conduit assembly 20 is shown mounted to frame member 64 with mount 114a. Frame member 64 is strut channel, like frame member 60 described above and shown in FIG. 24, and thus is not described in detail herein. The mount 114a includes an annular band 238 that is sized and configured for wrapping around the main section 104 of the first water conduit assembly 20. Tabs 240a,b extend generally perpendicular outward from the annular band 218. The tabs 240a,b may be spread apart from each other to open the annular band 238 and slide it around the first water conduit assembly 20. Aligned openings in the tabs 240a,b receive a fastener 242 that may be tightened to clamp the annular band 238 around the first water conduit assembly 20. Fingers 244a,b extend outward from the annular band 238 on the opposite side as the tabs 240a,b. When the mount 114a is rotated 90 degrees from the position shown in FIG. 25, the fingers 244a,b are insertable within the channel of the frame member 64. The mount 114a is then rotated 90 degrees to the position shown in FIG. 25 such that the fingers 244a,b extend under the lips of the frame member 64 and are retained within its channel. When the fastener 242 is loosened, the fingers 244a,b are positioned near each other to facilitate placement and movement within the strut channel. As the fastener 242 is tightened, the fingers 244a spread apart from each other to engage the inside surface of the frame member 64 thereby securing the mount 114a in place with respect to the frame member 64.

The first water conduit assembly 20 may be fastened to the frame member 64 with mount 114a when modular utility system 10 is manufactured and assembled at a location distant from the jail cell assembly 12. After the frame 14 is connected to the jail cell assembly 12, as described above, the mount 114a allows the installer to adjust the position of the first water conduit assembly 20 with respect to the mounted frame 14 and the jail cell assembly 12. For example, if the position of the first water conduit assembly 20 must be moved so that it lines up with the water connections of the jail cell assembly 12, the installer may loosen the fastener 242 to allow the fingers 244a,b to slide horizontally within the channel of the frame member 64. In this manner, and with the mounts 114b-d also loosened, the installer may slide the entire first water conduit assembly 20 laterally with respect to the frame 14 and jail cell assembly 12 in a generally horizontal direction across the width of the rear wall 36 of the jail cell assembly 12. When the first water conduit assembly 20 is in a desired position to where it aligns with water line connection points of the jail cell assembly 12, the fastener 242 may be tightened as described above. The mount 114*a* is securable to the frame 14 in a plurality of positions along the horizontal path of movement of the fingers 244*a,b* within the channel of the frame member 64.

The mount 114*a* also allows the installer to vertically adjust the first water conduit assembly 20. For example, the fastener 242 may be loosened to expand the annular band 238 and move it to an open position thereby allowing vertical movement of the first water conduit assembly 20 within the annular band 238. When the first water conduit assembly 20 is in a desired vertical position, the fastener 242 may be tightened as described above to move the annular band 238 to a closed position in which it clamps around the first water conduit assembly 20 and holds the first water conduit assembly 20 in a set vertical position. The first water conduit assembly 20 is securable to the mount 114*a* in a plurality of positions along the vertical path of movement of the first water conduit assembly 20 within the mount 114*a*. Thus, the mount 114*a* allows horizontal movement of the first water conduit assembly 20 by sliding the fingers 244*a,b* in a first direction with respect to the frame 14 and also vertical movement of the first water conduit assembly 20 through the mount 114*a* in a second direction that is generally perpendicular to the first direction. The frame members 48*a,b*, 50*a,b*, 52*a,b*, 54, 56, 58, 60, 62, 64, 66, 68, 70, 72, 74, and 76 (FIG. 4) that form the second section of the frame 14 are spaced apart from the rear wall 36 of the jail cell assembly 12 in a third direction that is generally perpendicular to the first direction of movement of the mount 114*a* with respect to the frame 14 and the second direction of movement of the first water conduit assembly 20 through the mount 114*a*.

The other mounts 114*b-h* (FIG. 8) of the first water conduit assembly 20, the mounts 138*a-d* (FIG. 12) of the second water conduit assembly 22, the mounts 150*a-j* (FIG. 14) of the third water conduit assembly 24, and the mounts 178*a-f* (FIG. 18) of the fourth water conduit assembly 26 are structured and operate in a similar manner as the mount 114*a* described above and shown in FIG. 25.

Figure 26:
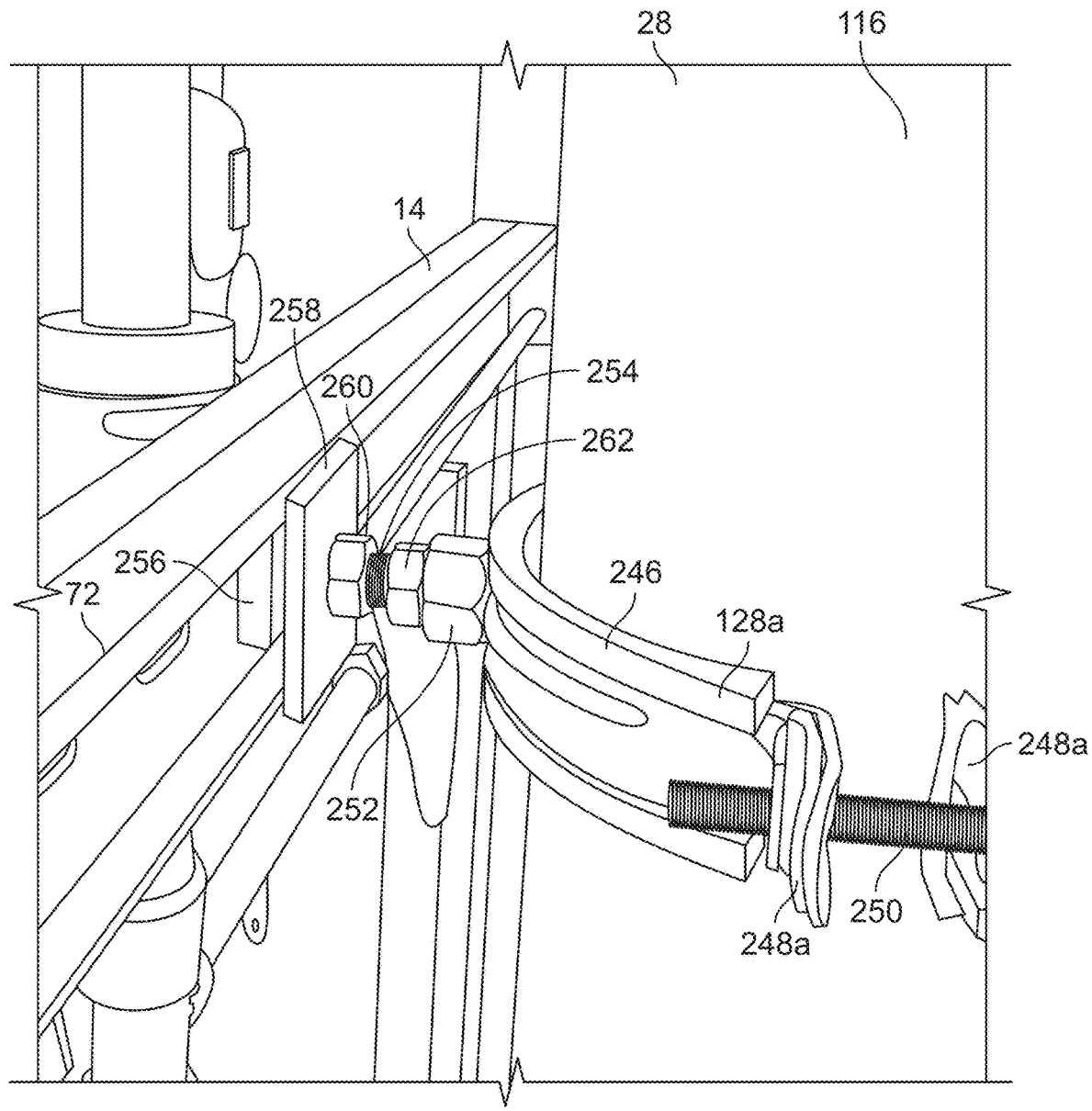
FIG. 26 is a perspective view of a connection between the frame and the first DWV conduit assembly.

Referring now to FIG. 26, first DWV conduit assembly 28 is shown mounted to frame member 72 with mount 128*a*. Frame member 72 is strut channel, like frame member 60 described above and shown in FIG. 24, and thus is not described in detail herein. The mount 128*a* includes an annular band 246 that is sized and configured for wrapping around the main section 116 of the first DWV conduit assembly 28. Tabs 248*a,b* extend generally perpendicular outward from the annular band 246. The tabs 248*a,b* may be spread apart from each other to open the annular band 246 and slide it around the first DWV conduit assembly 28. Aligned openings in the tabs 248*a,b* receive a fastener 250 that may be tightened to clamp the annular band 246 around the first DWV conduit assembly 28. A nut 252 mounted on the annular band 246 has a threaded opening (not shown) that receives a threaded rod 254. A conventional strut nut 256 is positioned within the channel of the frame member 72 in a similar manner as described above with respect to the strut nut 224 shown in FIG. 24. The threaded rod 254 threadingly engages a threaded opening (not shown) in the strut nut 256. The threaded rod 254 also passes through an opening in a square strut channel washer 258, which abuts and engages the exterior face of the frame member 72. A nut 260 on the threaded rod 254 allows an installer to rotate the threaded rod 254 and clamp the frame member 72 between the strut nut 256 and strut channel washer 258 in the same manner as described above with respect to mount 194*b* shown in FIG. 24. Another nut 262 threaded on the threaded rod 254 may be tightened against the nut 252 to secure the threaded rod 254 relative to the nut 252.

The first DWV conduit assembly 28 may be fastened to the frame member 72 with mount 128*a* when modular utility system 10 is manufactured and assembled at a location distant from the jail cell assembly 12. After the frame 14 is connected to the jail cell assembly 12, as described above, the mount 128*a* allows the installer to adjust the position of the first DWV conduit assembly 28 with respect to the mounted frame 14 and the jail cell assembly 12. For example, if the position of the first DWV conduit assembly 28 must be moved so that it lines up with the DWV connections of the jail cell assembly 12, the installer may loosen the nut 260 to allow the strut nut 256 to slide horizontally within the channel of the frame member 72. In this manner, and with the mounts 128*b-h* also loosened, the installer may slide the entire first DWV conduit assembly 28 laterally with respect to the frame 14 and jail cell assembly 12 in a generally horizontal direction across the width of the rear wall 36 of the jail cell assembly 12. When the first DWV conduit assembly 28 is in a desired position to where it aligns with DWV line connection points of the jail cell assembly 12, the nut 260 may be tightened as described above. The mount 128*a* is securable to the frame 14 in a plurality of positions along the horizontal path of movement of the strut nut 256 within the channel of the frame member 72.

The mount 128*a* also allows the installer to vertically adjust the first DWV conduit assembly 28. For example, the fastener 250 may be loosened to expand the annular band 246 and move it to an open position thereby allowing vertical movement of the first DWV conduit assembly 28 within the annular band 246. When the first DWV conduit assembly 28 is in a desired vertical position, the fastener 250 may be tightened as described above to move the annular band 246 to a closed position in which it clamps around the first DWV conduit assembly 28 and holds the first DWV conduit assembly 28 in a set vertical position. The first DWV conduit assembly 28 is securable to the mount 128*a* in a plurality of positions along the vertical path of movement of the first DWV conduit assembly 28 within the mount 128*a*. Thus, the mount 128*a* allows horizontal movement of the first DWV conduit assembly 28 by sliding the strut nut 256 in a first direction with respect to the frame 14 and also vertical movement of the first DWV conduit assembly 28 through the mount 128*a* in a second direction that is generally perpendicular to the first direction. The frame members 48*a,b*, 50*a,b*, 52*a,b*, 54, 56, 58, 60, 62, 64, 66, 68, 70, 72, 74, and 76 (FIG. 4) that form the second section of the frame 14 are spaced apart from the rear wall 36 of the jail cell assembly 12 in a third direction that is generally perpendicular to the first direction of movement of the mount 128*a* with respect to the frame 14 and the second direction of movement of the first DWV conduit assembly 28 through the mount 128*a*.

The other mounts 128*b-h* (FIGS. 9-10) of the first DWV conduit assembly 28, and the mounts 164*a-i* (FIGS. 15-16) of the second DWV conduit assembly 30 are structured and operate in a similar manner as the mount 128*a* described above and shown in FIG. 26.

Other items may be mounted on the frame 14, as needed and desired. For example, electrical conduit may be mounted on the frame 14 to retain, protect, and route electrical wiring. A water management system may be mounted on the frame 14 and connected to desired water lines to meter and monitor water usage within the jail cell assembly 12.

The modular utility system 10 may be manufactured and assembled at a remote location from the jail cell assembly 12 or other structure where it is installed for usage. The first HVAC conduit assembly 16, second HVAC conduit assembly 18, first water conduit assembly 20, second water conduit assembly 22, third water conduit assembly 24, fourth water conduit assembly 26, first DWV conduit assembly 28, and second DWV conduit assembly 30 may be tested for leaks prior to transport and installation. Any leaks in the modular utility system 10 may be corrected at the manufacture and assembly facility prior to transport and installation.

The modular utility system 10 is then transported to the jail cell assembly 12 for installation. The modular utility system 10 is lifted and moved so that the frame members 78a,b are positioned above the frame mounts 196, 206 and the frame members 80a,b are positioned above the frame mounts 208, 216. The modular utility system 10 is lowered until the frame members 78a,b are supported by the frame mounts 196, 206 and the frame members 80a,b are supported by the frame mounts 208, 216. Hitch pins are used to secure the frame members 78a,b to the frame mounts 196, 206, as described above, and to secure the frame members 80a,b to the frame mounts 208, 216. The frame members 82a,b are welded to the rear wall 36, as described above. The floor mounts 49a,b are secured to the floor and to the lower vertical frame members 48a,b as described above.

Once the frame 14 is secured to the jail cell assembly 12 and floor, connections may be made between the HVAC ducting, water lines, and DWV lines of the facility where the modular utility system 10 is being installed and the HVAC ducting, water lines, and DWV lines of the modular utility system 10. Further, connections may be made between the HVAC ducting, water lines, and DWV lines of the jail cell assembly 12 and the HVAC ducting, water lines, and DWV lines of the modular utility system 10. The HVAC ducting, water lines, and DWV lines of the modular utility system 10 may be adjusted as described above so that they align with like lines of the facility and/or jail cell assembly 12 to facilitate installation. Multiple modular utility systems, like modular utility system 10, may be installed at the facility.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A modular utility system comprising:
a frame configured for mounting to a structure;
a mount that is coupled to the frame, wherein the mount is adjustably movable with respect to the frame in a first direction, wherein the mount is securable to the frame in a plurality of positions, and wherein a portion of the mount engages the frame and is slidable in the first direction with respect to the frame when the mount is not secured to the frame; and
a conduit that is coupled to the mount, wherein the conduit is adjustably movable with respect to the mount in a second direction that is generally perpendicular to the first direction, wherein the mount is movable from an open position, in which the conduit is movable through the mount in the second direction, to a closed position, in which the conduit is clamped by the mount, and wherein the mount is configured to secure the conduit in a plurality of positions,
wherein the frame comprises a first section that is configured for mounting to the structure,
wherein the frame comprises a second section that is coupled to the first section and spaced apart from the structure in a third direction when the first section is mounted to the structure, wherein the third direction is generally perpendicular to the first direction and the second direction,
wherein the first section of the frame comprises a plurality of elongate frame members each coupled to the second section and extending away from the second section in the third direction,
wherein the second section of the frame comprises a first plurality of frame members that extend in the first direction, and wherein the second section of the frame comprises a second plurality of frame members that extend in the second direction,
wherein the conduit has a main section that extends in the second direction from a first end to a second end, and wherein the conduit has a branch section that extends from the main section in the third direction, the branch section being configured for coupling to a portion of the structure.

2. The system of claim 1, wherein the first section of the frame is receivable within a channel of a frame mount that is configured for mounting to the structure.

3. The system of claim 1, wherein the conduit is configured to contain at least one of water, air, or wastewater.

4. The system of claim 3, further comprising a second conduit that is securable to the frame in a second plurality of positions, and a third conduit that is securable to the frame in a third plurality of positions, wherein the conduit, the second conduit, and the third conduit are each configured to contain the at least one of water, air, or wastewater.

5. The system of claim 1, wherein the frame defines at least one channel that receives the portion of the mount that engages the frame, and wherein the mount is operable to slide within the channel in the first direction when the mount is not secured to the frame.

6. The system of claim 1, wherein the frame further comprises at least one floor mount that is adjustably coupled to a lower end of the frame.

7. The system of claim 1, wherein the conduit has a second branch section that extends from the main section in the third direction, the second branch section being configured for coupling to a second portion of the structure, and the second branch section spaced apart from the branch section.

8. The system of claim 7, wherein the frame is configured for attachment to a rear wall of a jail cell assembly including an upper jail cell positioned above a lower jail cell, wherein the branch section is configured for coupling to an inlet or an outlet of the upper jail cell, and wherein the second branch section is configured for coupling to an inlet or an outlet of the lower jail cell.

9. The system of claim 1, further comprising a second conduit that is securable to the frame in a plurality of positions, and a third conduit that is securable to the frame in a plurality of positions, wherein the conduit is configured to contain water, the second conduit is configured to contain air, and the third conduit is configured to contain wastewater.

10. A method of installing a modular utility system, the method comprising the steps of:
   providing the modular utility system of claim 1;
   mounting the frame to a structure;
   adjusting one of the plurality of positions of the mount and the conduit with respect to the frame in the first direction;
   securing the mount to the frame in a first fixed position;
   adjusting the position of the conduit with respect to the mount in the second direction that is generally perpendicular to the first direction; and
   securing the conduit to the mount in a second fixed position.

11. The method of claim 10, wherein the structure comprises a jail cell, and wherein the frame is mounted to a rear wall of the jail cell.

12. The method of claim 10, further comprising:
   adjusting a second mount position of a second mount with respect to the frame in the first direction;
   securing the second mount to the frame in a third fixed position;
   adjusting a position of a second conduit with respect to the second mount in the second direction;
   securing the second conduit to the second mount in a fourth fixed position;
   adjusting a third mount position of a third mount with respect to the frame in the first direction;
   securing the third mount to the frame in a fifth fixed position;
   adjusting a third conduit position of a third conduit with respect to the third mount in the second direction; and
   securing the third conduit to the third mount in a sixth fixed position.

13. The method of claim 12, wherein the conduit, the second conduit, and the third conduit are each configured to contain at least one of water, air, or wastewater.

14. The method of claim 10, further comprising connecting the conduit to a portion of the structure.

15. The method of claim 10, wherein the step of adjusting the position of the mount and conduit with respect to the frame comprises sliding the mount within a channel of the frame in the first direction.

16. The method of claim 10, further comprising:
   adjusting a floor mount position of a floor mount with respect to the frame;
   securing the floor mount to the frame; and
   securing the floor mount to a floor.

* * * * *